(12) United States Patent
Daniels et al.

(10) Patent No.: US 7,970,834 B2
(45) Date of Patent: Jun. 28, 2011

(54) METHOD AND PROGRAM PRODUCT FOR TRACKING A FILE ATTACHMENT IN AN E-MAIL

(75) Inventors: Fonda J. Daniels, Cary, NC (US); Ruthie D. Lyle, Durham, NC (US); Demethria J. Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 11/267,401

(22) Filed: Nov. 3, 2005

(65) Prior Publication Data

US 2007/0100991 A1    May 3, 2007

(51) Int. Cl.
*G06F 15/16* (2006.01)
(52) U.S. Cl. ......................... 709/206; 709/213; 709/217
(58) Field of Classification Search .................... 709/206
See application file for complete search history.

(56) References Cited

U.S. PATENT DOCUMENTS

| 6,618,747 B1* | 9/2003 | Flynn et al. ................ 709/206 |
| 6,629,131 B1* | 9/2003 | Choi ............................ 709/206 |
| 6,732,101 B1 | 5/2004 | Cook |
| 6,751,670 B1* | 6/2004 | Patterson .................... 709/229 |
| 6,792,544 B2* | 9/2004 | Hashem et al. ............. 726/30 |
| 6,898,625 B2* | 5/2005 | Henry et al. ................ 709/206 |
| 2002/0007453 A1* | 1/2002 | Nemovicher ............... 713/155 |
| 2002/0040387 A1 | 4/2002 | Lessa et al. |
| 2002/0091782 A1* | 7/2002 | Benninghoff, III ........... 709/206 |
| 2002/0143881 A1 | 10/2002 | DeLaCruz |
| 2003/0115544 A1 | 6/2003 | Henry et al. |
| 2003/0172120 A1 | 9/2003 | Tomkow et al. |
| 2004/0025057 A1 | 2/2004 | Cook |
| 2004/0186894 A1* | 9/2004 | Jhingan et al. ............... 709/207 |
| 2005/0021963 A1 | 1/2005 | Tomkow |
| 2006/0112165 A9* | 5/2006 | Tomkow et al. ............. 709/206 |

FOREIGN PATENT DOCUMENTS

| WO | WO 01110090 A1 | 2/2001 |
| WO | WO 0211025 A2 | 2/2002 |
| WO | WO 0237372 A1 | 5/2002 |

* cited by examiner

*Primary Examiner* — Jeffrey Pwu
*Assistant Examiner* — Jasmine Myers
(74) *Attorney, Agent, or Firm* — Schmeiser, Olsen & Watts; Anna L. Linne

(57) ABSTRACT

A method and program product for tracking a file attachment in an e-mail is provided. The method includes attaching one or more file attachments to an e-mail, selecting one or more return receipt properties for the file attachments attached to the e-mail, sending the e-mail to one or more intended recipients and writing to an e-mail data log file a set of details pertaining to the file attachments attached to the e-mail sent, such that a sender is able to track in the e-mail data log file any file attachments attached to the e-mail sent. Preferably, the method includes notifying the sender when either a delivery failure or a delivery discrepancy occurs for any file attachment attached to the e-mail sent to any intended recipients. More preferably, the method includes managing the set of details pertaining to the file attachments in the e-mail data log file.

15 Claims, 15 Drawing Sheets

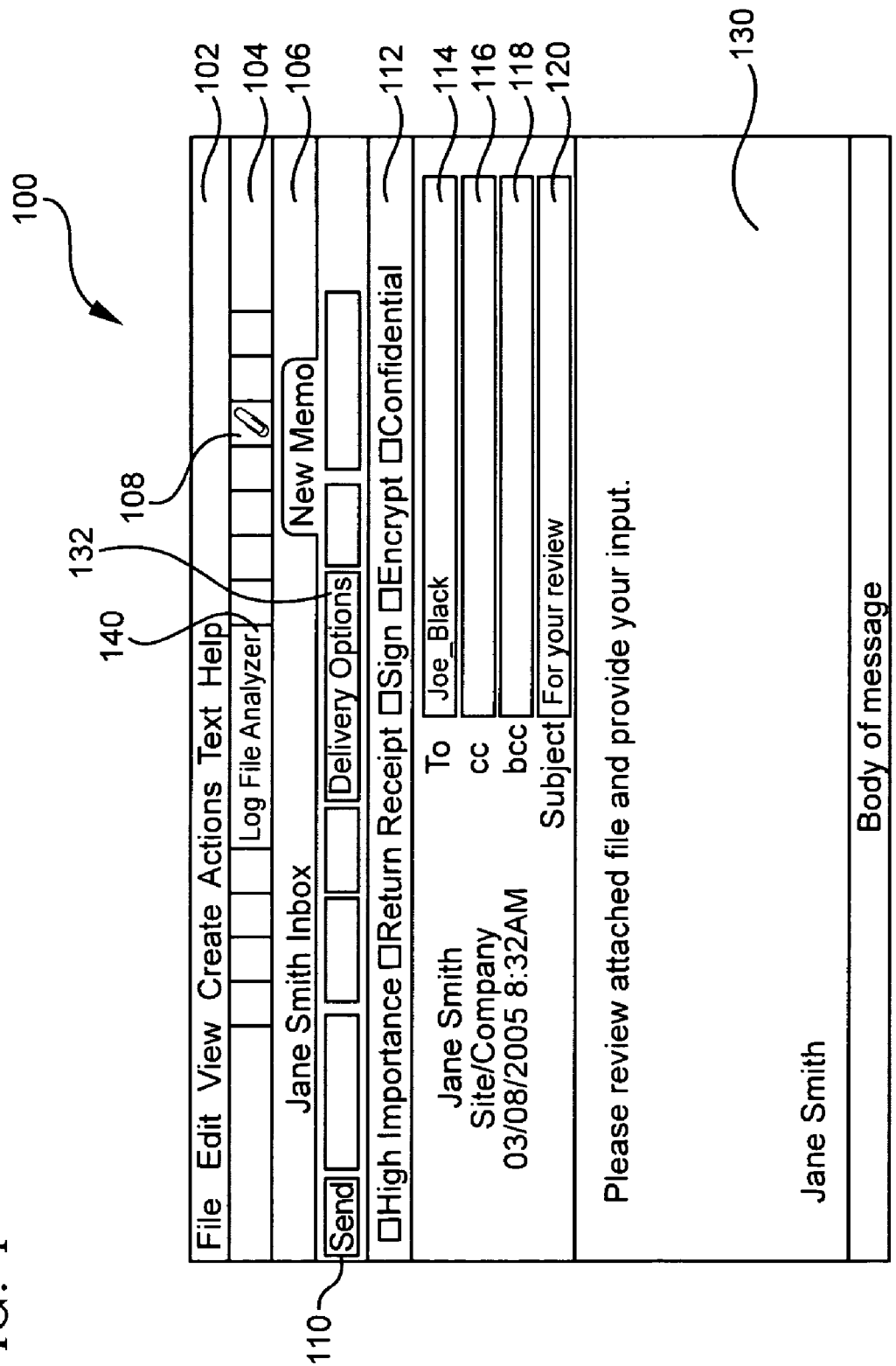

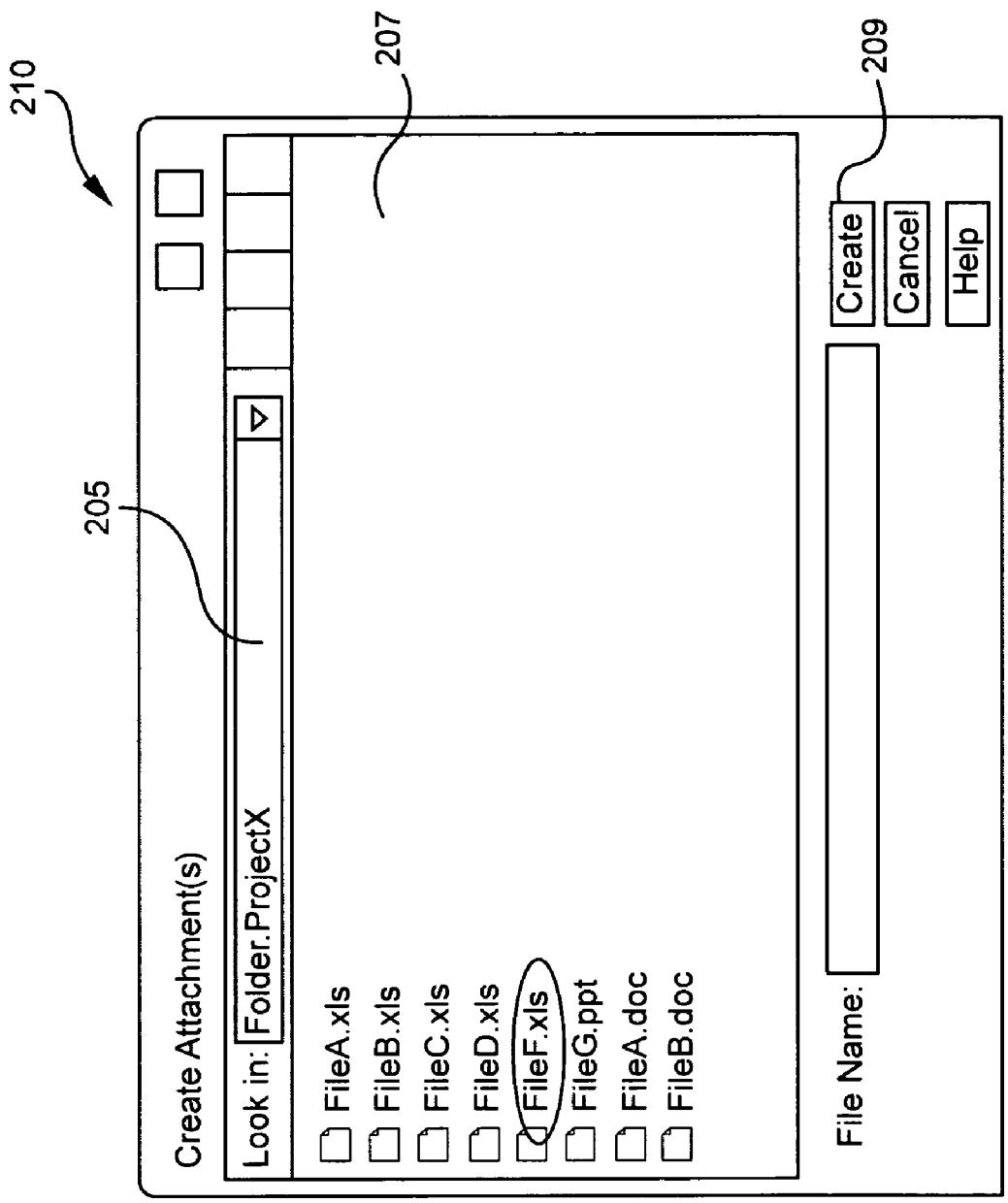

METHOD AND PROGRAM PRODUCT FOR TRACKING A FILE ATTACHMENT IN AN E-MAIL

FIELD OF THE INVENTION

The present invention relates to the field of electronic mail (e-mail) communications and, more particularly, the invention relates to a method and computer program product for tracking a file attachment attached to an e-mail.

BACKGROUND OF THE INVENTION

In today's business environment, organizations and/or businesses utilize electronic mail (e-mail) to communicate both internally within the organizations and/or businesses and externally with other organizations and/or businesses. Often, files or documents are attached to e-mail messages and, frequently, a sender of a file or document sent in an e-mail expects answers or responses to the file or document that is attached. As such, there is a need for an efficient way to communicate electronically, so that e-mails and any contents can be managed efficiently. Accordingly, there exists a need in the art to overcome the deficiencies and limitations described hereinabove.

SUMMARY OF THE INVENTION

In a first aspect of the invention, there is provided a method of tracking a file attachment sent in an e-mail. The method comprises the steps of attaching one or more file attachments to an e-mail created in an e-mail application, selecting one or more return receipt properties for the one or more file attachments attached to the e-mail, sending the e-mail to one or more intended recipients specified for the e-mail and writing to an e-mail data log file a set of details pertaining to the one or more file attachments attached to the e-mail sent, such that a sender is able to track in the e-mail data log file any one of the one or more file attachments attached in the e-mail sent. Preferably, the method comprises the step of notifying the sender when either a delivery failure or a delivery discrepancy occurs for any of the one or more file attachments attached to the e-mail sent to any of the one or more intended recipients. More preferably, the method comprises the step of managing the set of details pertaining to the one or more file attachments in the e-mail data log file. The attaching step further comprises the steps of opening an e-mail composition window in an e-mail application for creating the e-mail and specifying one or more of the intended recipients for at least one of a plurality of recipient groups for the e-mail. Further, the writing step comprises the step of updating the set of details written to the e-mail data log file. Preferably, the set of details comprises one or more of initial details for the one or more file attachments sent in the e-mail and return receipt details for the one or more file attachments sent in the e-mail. The updating step further comprises comparing the initial details of each of the one or more file attachments in the e-mail data log file with the return receipt details of each of the one or more file attachments in the e-mail data log file to check for either the delivery failure, the delivery discrepancy, a successful delivery or an opening of any of the one or more file attachments, and sending e-mail notification to the sender if either the delivery failure or the delivery discrepancy occurs.

In another aspect of the invention, there is provided a method of obtaining one or more return receipts for a file attachment sent in an e-mail. The method comprises the steps of creating an e-mail in an e-mail composition window of an e-mail application, specifying one or more intended recipients for the e-mail, inserting at least one file attachment into the e-mail, selecting one or more return receipt properties for the at least one file attachment inserted into the e-mail before sending the e-mail, sending the e-mail to the one or more intended recipients specified for the e-mail, creating an e-mail data log file adapted to receive a set of details pertaining to the at least one file attachment inserted into the e-mail sent, and receiving one or more return receipts corresponding to each of the one or more return receipt properties selected for the at least one file attachment inserted into the e-mail sent. The method further comprises the step of managing the set of details pertaining to the at least one file attachment in the e-mail data log file. Further, the receiving one or more return receipts step comprises updating the set of details in the e-mail data log file and sending e-mail notification to a sender if either a delivery failure or delivery discrepancy occurs for the at least one file attachment.

In yet another aspect of the invention, there is provided a computer program product for tracking a file attachment inserted into an e-mail that is sent. The computer program product comprises a computer readable medium, first program instructions to create an e-mail in an e-mail application addressed to one or more intended recipients, the first program instructions including instructions to insert one or more file attachments in the e-mail and to select one or more return receipt properties for any of the one or more file attachments inserted into the e-mail, second program instructions to write to an e-mail data log file initial details for each of the one or more file attachments inserted into the e-mail when the e-mail is sent, the second program instructions including instructions to update the e-mail data log file, and third program instructions to notify a sender when either a delivery failure or a delivery discrepancy occurs for any of the one or more file attachments sent to any of the one or more intended recipients. The computer program product further comprises fourth program instructions to manage the e-mail data log file. The second program instructions to update the e-mail data log file further comprises instructions to write to the e-mail data log file return receipt details for the one or more file attachments inserted into the e-mail sent. Further, the third program instructions to notify comprises instructions to compare the initial details of each of the one or more file attachments in the e-mail data log file with the return receipt details of each of the one or more file attachments in the e-mail data log file to check for either the delivery failure, the delivery discrepancy, a successful delivery or an opening of any of the one or more file attachments, and instructions to send e-mail notification to the sender if either the delivery failure or the delivery discrepancy occurs. Preferably, the first, second, third and fourth program instructions are stored on the medium.

Further yet, in another aspect of the invention, there is provided a method for deploying computing infrastructure, comprising integrating computer-readable code into a computing system, wherein the code in combination with the computing system is capable of performing a process of tracking a file attachment sent in an e-mail. The process comprises attaching one or more file attachments to an e-mail created in an e-mail application, selecting one or more return receipt properties for the one or more file attachments attached to the e-mail, sending the e-mail to one or more intended recipients specified for the e-mail, and writing to an e-mail data log file a set of details pertaining to the one or more file attachments attached to the e-mail sent, such that a sender is able to track in the e-mail data log file any one of the one or more file attachments attached to the e-mail sent. Further, the process comprises notifying the sender when either a delivery failure or a delivery discrepancy occurs for any of the one or more file attachments attached to the e-mail sent to any of the one or more intended recipients and managing the set of details pertaining to the one or more file attachments in the e-mail data log file. Preferably, the attaching step further comprises opening an e-mail composition window in an e-mail application for creating the e-mail, and specifying one or more of the intended recipients for at least one of a plurality of recipient groups for the e-mail. Preferably, the writing step further comprises updating the set of details written to the e-mail data log file, and wherein the set of details comprises one or more of: initial details for the one or more file attachments sent in the e-mail and return receipt details for the one or more file attachments sent in the e-mail. More preferably, the updating step further comprises comparing the initial details of each of the one or more file attachments in the e-mail data log file with the return receipt details of each of the one or more file attachments in the e-mail data log file to check for either the delivery failure, the delivery discrepancy, a successful delivery or an opening of any of the one or more file attachments, and sending e-mail notification to the sender if either the delivery failure or the delivery discrepancy occurs.

Preferably, the one or more return receipt properties for the one or more file attachments comprises at least one of log file location, return receipt log file collection, return receipt delivery options, return receipt client options, read receipt from an intended recipient, detach receipt from an intended recipient, read receipt from an unintended recipient, and detach receipt from an unintended recipient. Further, the initial details of the e-mail data log file preferably comprise at least one of names and e-mail addresses of each of the one or more intended recipients, subject, time and date when the e-mail is sent, name and type of each of the one or more file attachments, creation date and author of each of the one or more file attachments, size of each of the one or more file attachments, and security access rights for each of the one or more file attachments. More preferably, the return receipt details of the e-mail data log file comprise at least one of logfile directory location, logfile name, name and e-mail address of each recipient from the one or more intended recipients to whom the e-mail is delivered, subject, time and date when the e-mail is delivered, name, type and size of each of the one or more file attachments delivered, name and e-mail address of any intended recipient to whom the one or more file attachments in the e-mail is not delivered, name, type and size of each of the one or more file attachments not delivered, failed attempt to deliver the e-mail to any of the one or more intended recipients specified, name, e-mail address, subject, time and date when the e-mail is re-sent, name and e-mail address of an intended recipient who opens any of the one or more file attachments, time and date when the one or more file attachments is opened by an intended recipient, name, type and size of each of the one or more file attachments opened by an intended recipient, name and e-mail address of an intended recipient who detaches any of the one or more file attachments, name and e-mail address of an unintended recipient who opens the e-mail with the one or more file attachments, time and date when the one or more file attachments is opened by an unintended recipient, name, type and size of each of the one or more file attachments opened by an unintended recipient, name and e-mail address of an unintended recipient who detaches the e-mail with the one or more file attachments, name, type and size of each of the one or more file attachments detached, and time and date when e-mail is detached by an unintended recipient.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an illustration of a new e-mail composition window or screen in an e-mail application, in accordance with an embodiment of the present invention.

FIG. 2B is an illustration of a sub-window or sub-screen for selecting a file attachment for attaching to a new e-mail composition window or screen in an e-mail application, in accordance with an embodiment of the present invention.

BEST MODE FOR CARRYING OUT THE INVENTION

Figure 2A:
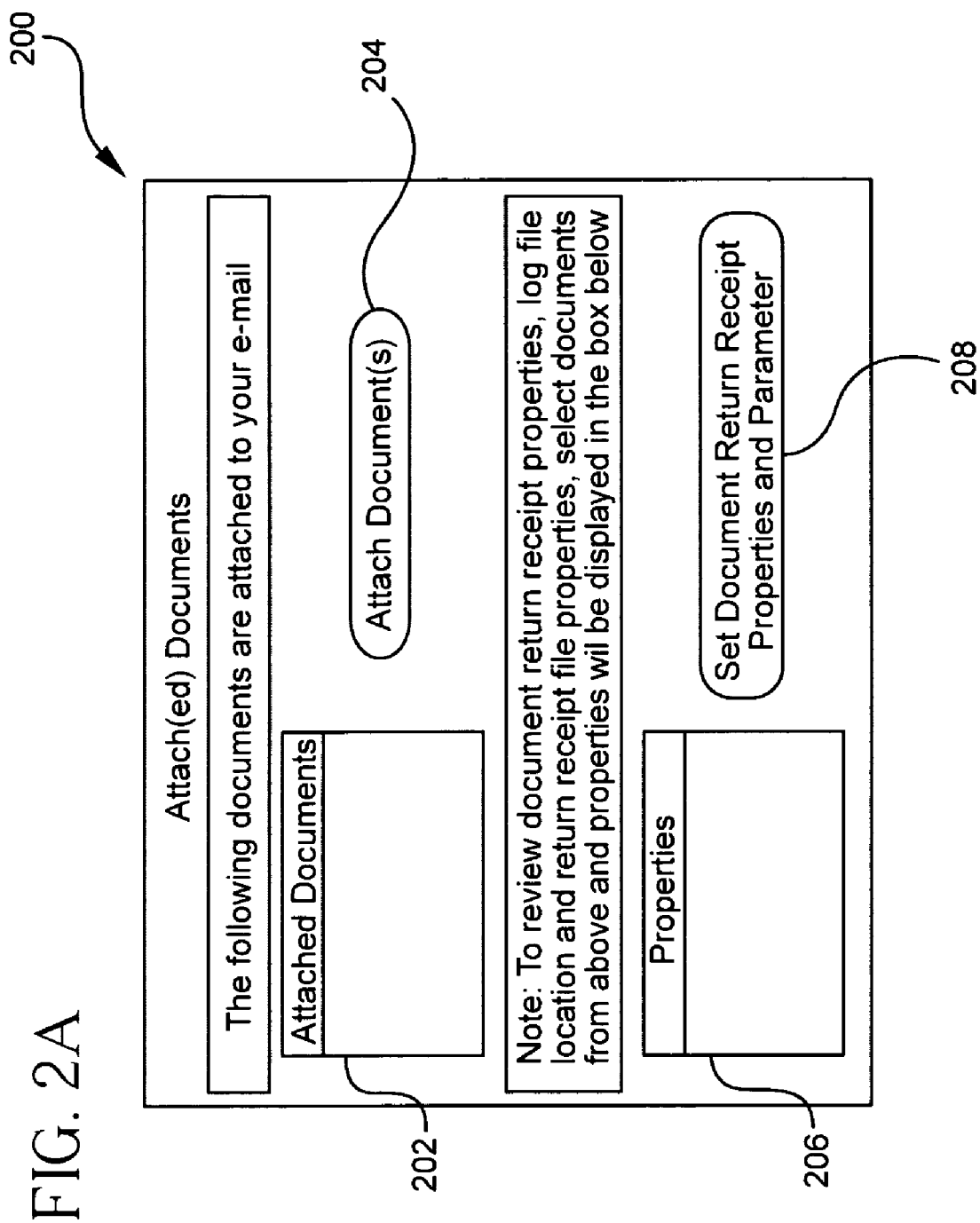
FIG. 2A is an illustration of a sub-window or sub-screen for attaching a file attachment in a new e-mail composition window or screen in an e-mail application, in accordance with an embodiment of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method of tracking a file attachment sent in an e-mail. The method comprises opening an e-mail composition window in an e-mail application for creating an e-mail and attaching one or more file attachments to the created e-mail. Further, the method comprises specifying one or more intended recipients for at least one of a plurality of recipient groups for the e-mail. Preferably, the plurality of recipient groups comprises a To recipient group, a cc recipient group and a bcc recipient group. The method further comprises selecting one or more return receipt properties for the one or more file attachments attached to the e-mail; sending the e-mail to one or more intended recipients specified, and writing to an e-mail data log file a set of details pertaining to the one or more file attachments attached to the e-mail sent, such that a sender is able to track in the e-mail data log file any one of the one or more file attachments attached to the e-mail sent. The method further comprises the step of notifying the sender when either a delivery failure or a delivery discrepancy occurs for any of the one or more file attachments attached to the e-mail sent to any of the one or more intended recipients. The method further comprises the step of managing the set of details pertaining to the one or more file attachments in the e-mail data log file. Preferably, the writing step further comprises the step of updating the set of details written to the e-mail data log file, and wherein the set of details comprises one or more of initial details for the one or more file attachments sent in the e-mail and return receipt details for the one or more file attachments sent in the e-mail. Preferably, the updating step further comprises the step of comparing the initial details of each of the one or more file attachments in the e-mail data log file with the return receipt details of each of the one or more file attachments in the e-mail data log file to check for either the delivery failure or the delivery discrepancy; and sending e-mail notification to the sender if either the delivery failure or the delivery discrepancy occurs.

In one embodiment, the one or more return receipt properties for the one or more file attachments includes log file location, return receipt log file collection, return receipt delivery options, return receipt client options, read receipt from an intended recipient, detach receipt from an intended recipient, read receipt from an unintended recipient, and detach receipt from an unintended recipient. Further, preferably, the initial details of the e-mail data log file comprise at least one of names and e-mail addresses of each of the one or more intended recipients; subject, time and date when the e-mail is sent; name and type of each of the one or more file attachments; creation date and author of each of the one or more file attachments; size of each of the one or more file attachments; and security access rights for each of the one or more file attachments and the return receipt details of the e-mail data log file comprise at least one of logfile directory location, logfile name, name and e-mail address of each recipient from the one or more intended recipients to whom the e-mail is delivered; subject, time and date when the e-mail is delivered; name, type and size of each of the one or more file attachments delivered; name and e-mail address of any intended recipient to whom the one or more file attachments in the e-mail is not delivered; name, type and size of each of the one or more file attachments not delivered; failed attempt to deliver the e-mail to any of the one or more intended recipients specified; name, e-mail address, subject, time and date when the e-mail is re-sent; name and e-mail address of an intended recipient who opens any of the one or more file attachments; time and date when the one or more file attachments is opened by an intended recipient; name, type and size of each of the one or more file attachments opened by an intended recipient; name and e-mail address of an intended recipient who detaches any of the one or more file attachments; name and e-mail address of an unintended recipient who opens the e-mail with the one or more file attachments; time and date when the one or more file attachments is opened by an unintended recipient; name, type and size of each of the one or more file attachments opened by an unintended recipient; name and e-mail address of an unintended recipient who detaches the e-mail with the one or more file attachments; name, type and size of each of the one or more file attachments detached; and time and date when e-mail is detached by an unintended recipient.

As used herein, the term "e-mail" refers to an electronic mail composed using any e-mail application program, preferably, a commercially available e-mail application program, such as, the Lotus Notes® e-mail application program that is commercially available from International Business Machines (IBM). Also, the term "e-mail" or "original e-mail" or "new e-mail" is intended to refer to an e-mail that is created and sent to one or more recipients specified for the e-mail. The term "document" or "file" or "attachment" or "file attachment" refers to a file that is inserted or attached to an e-mail. Further, as used herein, the term "recipient" is intended to refer to any recipient or party specified or identified in any of the plurality of recipient groups in the e-mail by either selecting from a list of recipients or by entering an e-mail address. Further, the term "recipient" is intended to include both an individual recipient as well as a group of individuals that are categorized together as one recipient. As used herein, the term "intended recipient" refers to the recipient or recipients specified in either the To, the cc or the bcc recipient groups or sections of an e-mail. Also, as used herein, the term "unintended recipient" refers to any recipient that was not specified in the original e-mail that was sent. Additionally, the term "logfile" or "log file" refers to the file that is created for logging or tracking relevant information pertaining to an e-mail itself as well as any file attachment attached to the e-mail. Further, the term "log file analyzer" or "log analyzer" refers to an application or program that facilitates the managing of one or more logfiles that are created.

Reference is now made to FIGS. 1 through 7, which illustrate a method of tracking and obtaining return receipts for one or more file attachments sent in an e-mail, in accordance with an embodiment of the invention. Turning to FIG. 1, numeral 100 shows the creation of a new e-mail (shown by the New Memo tab in row 106) in an e-mail composition window for attaching a file attachment. The new e-mail composition window 100 shows a main menu bar 102 at the top that contains the main menu items File, Edit, View, Create, Actions, Text and Help. The originator, Jane Smith has specified the intended recipient "Joe_Black" in the To recipient group 114, while there are no recipient(s) specified in either the cc recipient group 116 or the bcc recipient group 118. The subject field 120 contains the subject title "For your review", and the body 130 contains a message typed by the originator with respect to the file attachment. As shown in FIG. 1, there is a delivery options button 132 towards the top, which contains various delivery options for the e-mail itself, along with other delivery options for the e-mail itself shown in the bar 112, such as, High Importance, Return Receipt, etc. These delivery options in bar 112 can provide an indication as to whether or not the originator has selected any return receipt options for the new e-mail itself. Further, the composition window 100 displays another bar 104 that contains a paper clip icon, reference number 108, which is the file attachment button 108 used for attaching a file in the e-mail. Additionally, there is a bar 104 towards the top which shows a "Log File Analyzer" button 140, which is used to manage one or more log files that are created for tracking any file attachments that are sent in one or more e-mails. Also, there is a Delivery Options button 132, which provides delivery options for the e-mail, whereas, the Send button 110 is used to send the e-mail.

Figure 2C:
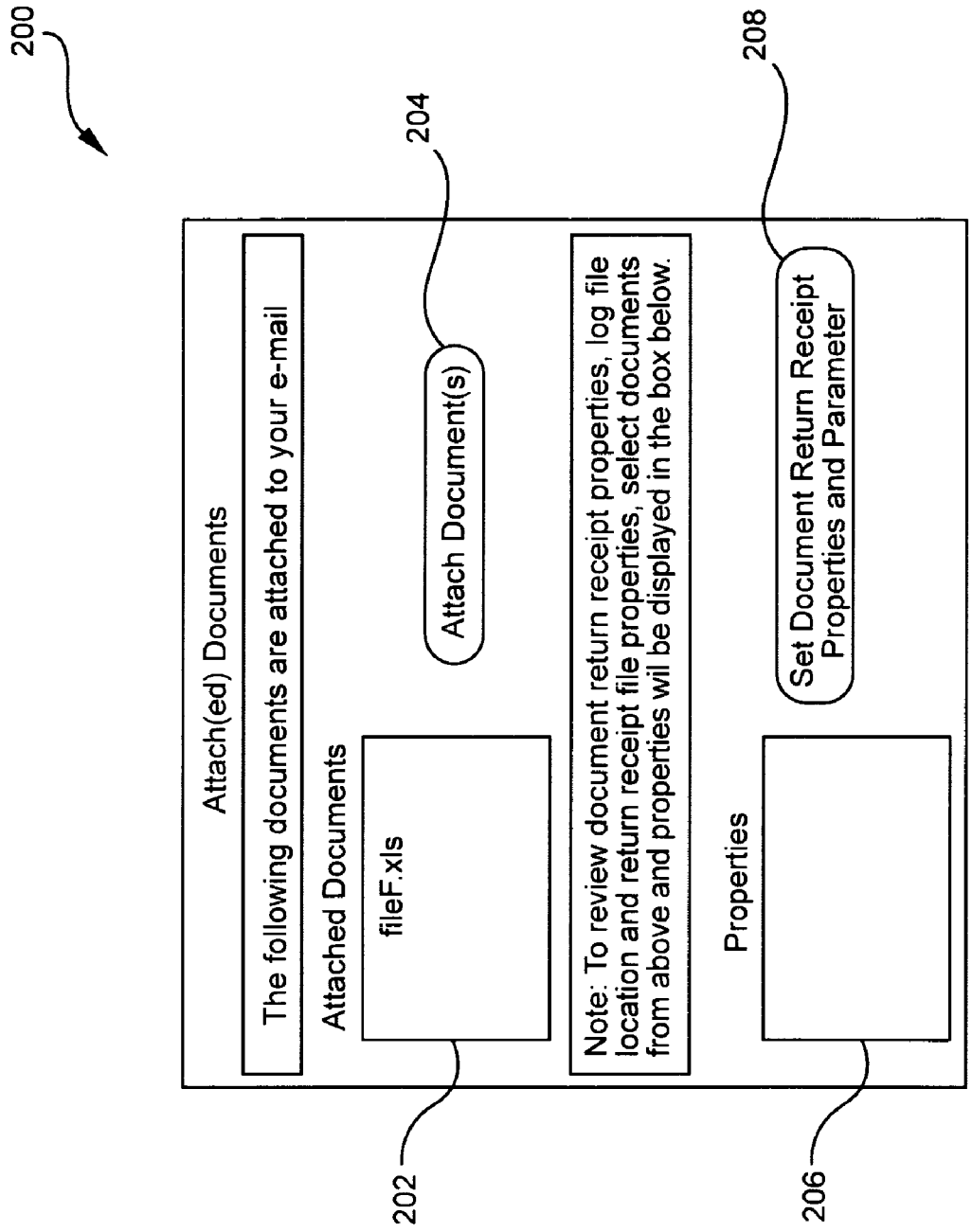
FIG. 2C is an illustration of a sub-window or sub-screen showing any files attached to a new e-mail composition window or screen in an e-mail application, in accordance with an embodiment of the present invention.
Figure 2E:
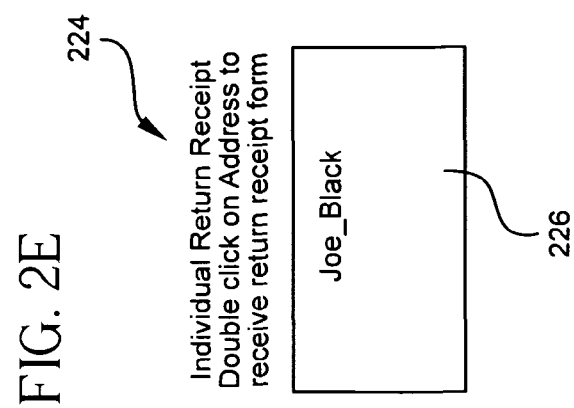
FIG. 2E is an illustration of a sub-window or sub-screen for obtaining individual return receipts for a file attachment in a new e-mail composition window or screen in an e-mail application, in accordance with an embodiment of the present invention.

When the originator or sender of the e-mail is ready to insert or attach a file attachment, the sender clicks on the file attachment button 108. This takes the sender to the screen 200 shown in FIG. 2A. The sender clicks on the Attach Document(s) button 204, which allows the sender to browse or look (as shown in FIG. 2B) in any folder on the sender client for finding the appropriate file attachment. Screen 210 shows a "ProjectX" folder 205 from which the sender scrolls down to the file "FileF.xls" shown circled in the list 207 and selects file "FileF.xls." by clicking on the Create button 209 towards the bottom of screen 210. This takes the sender back to the file attachment screen 200 that was shown in FIG. 2B. However, the screen 200 now shown in FIG. 2C lists the file "fileF.xls" in the Attached Documents sub-window 202. Further, as shown in FIG. 2C, the sender can set the return receipt properties 206 for the file attachment by clicking on the "Set Document Return Receipt Properties and Parameter" button 208, which takes the sender to the screen 230 shown in FIG. 2D. The screen 230 shows the name of the file attachment at the top, namely, file "fileF.xls". Further, the screen provides options for tracking the document or file attachment. In particular, the field "Track document Return Receipts" at the top has the option buttons Yes 212 or No 214, with No being shown as the default as per the darkened circle 214. However, if the sender desires to track a file attachment being sent, the sender clicks on the Yes button 212 and further specifies which of the recipients the sender wants return receipts from. For instance, the sender can select return receipts for the To group 216, the cc group 218, the bcc group 220 or the sender can specify an individual (to whom a file attachment is being sent) by clicking on the Specify Individual button 222. For instance, if the recipients specified in the To group is Group_1, which is made up of five individuals, and the sender only wants a return receipt from one of the individuals in Group_1, the sender clicks on the Specify Individual button 222, which takes the sender to the screen 224 shown in FIG. 2E. The sender can enter the name of the one individual in Group_1 that the sender wants a return receipt from in the field 226. For example, if the e-mail in FIG. 1 is intended for Group_1, which is made up of Dan Smith and Joe Black, and if the sender only wanted a return receipt for the file attachment from Joe Black, the sender can select or type in the e-mail address for Joe Black in field 226.

Figure 2D:
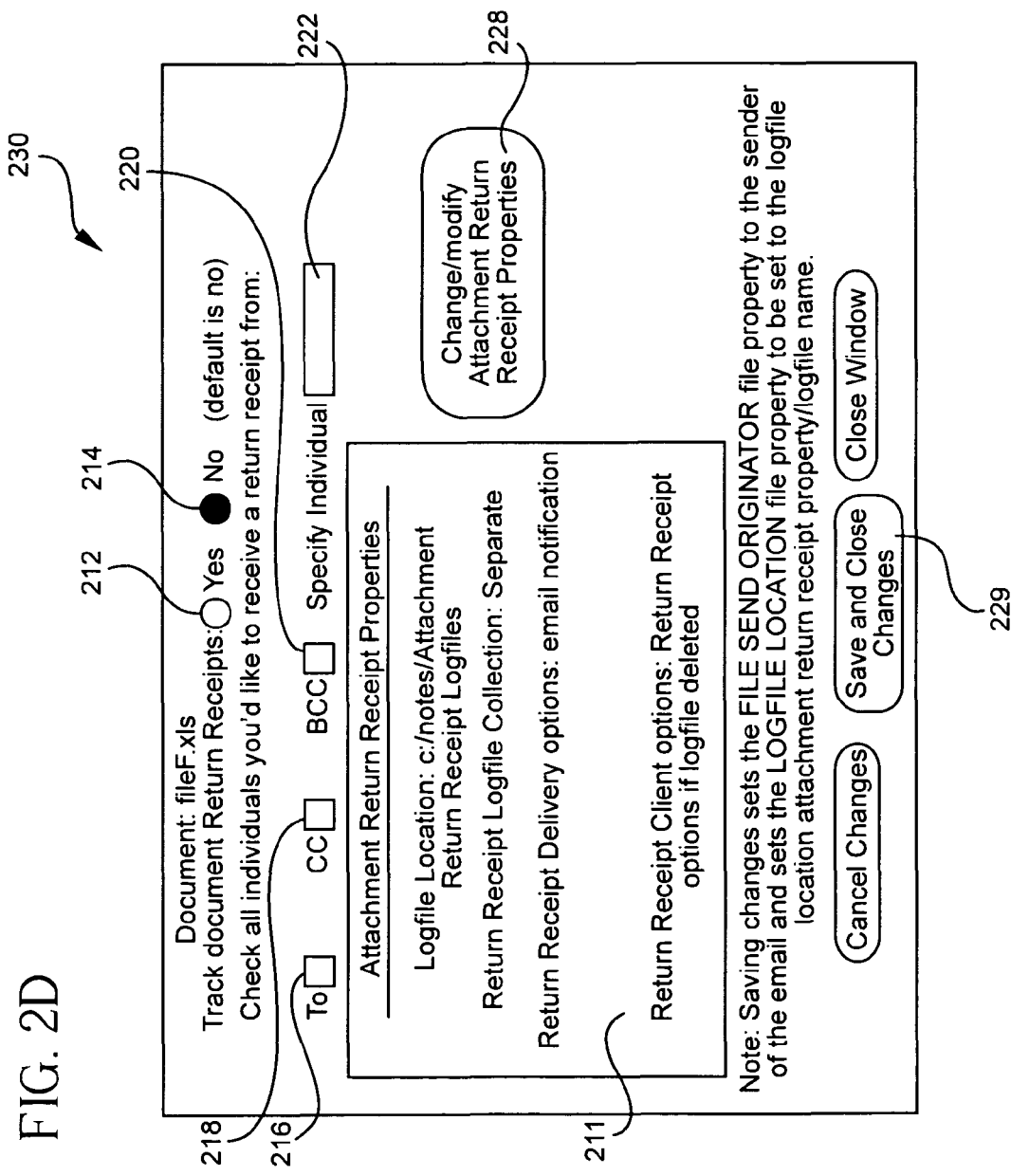
FIG. 2D is an illustration of a sub-window or sub-screen showing return receipt properties for a file attachment in a new e-mail composition window or screen in an e-mail application, in accordance with an embodiment of the present invention.

Furthermore, screen 230 in FIG. 2D has an "Attachment Return Receipt Properties" sub-window 211, which lists the different properties for the logfile that is to be created for the one or more file attachments that are being attached to an e-mail. If the sender does not wish to change or modify the properties, the sender clicks on the Save and Close Changes button 229 towards the bottom of the screen 230. However, if the sender wants to modify any of these properties, the sender clicks on the Change/modify Attachment Return Receipt Properties button 228, which takes the sender to screen 290 shown in FIG. 2F. Screen 290 shows the various options under "Change/modify Attachment Return Receipt Properties", such as, Logfile Location 250, Return Receipt Logfile Collection 260, Return Receipt Delivery Options 270 and Return Receipt Options 280. As shown in screen 290, the default location of the file is set forth in the darkened button 252. In the example shown, it is set to "c:/notes/Attachment Return Receipt Logfiles". However, the sender can change the location by clicking on button 254 to specify a new location for the logfile. Further, the Return Receipt Logfile Collection 260 shows the default button 262 as being selected to "Separate Return Receipts for each attachment", which means that the return receipt for each file attachment will be kept separate. Again, the sender can choose to aggregate the return receipts for all the file attachments in an e-mail by selecting the button 264 "Aggregate Return Receipts for each attachment in an e-mail", which will combine the return receipts for more than one file attachments in the specified logfile. Furthermore, the Return Receipt Delivery Options 270 shows the default button 272 being selected in order to "Receive attachment return receipt in email", which means that the sender will receive a return receipt for the received file attachment via e-mail. Alternatively, the sender can select the button 274 to "Write directly to logfile", in which case, the sender will not receive any e-mail return receipt notifications in the sender's inbox, but the sender can find out the information for the file attachment by accessing the logfile in the designated directory. Finally, the Return Receipt Options 280 show that the default button 282 for "Delete Return Receipts if logfile is missing" is selected, which means that if the logfile is missing or deleted then any incoming return receipts will be deleted since there is no logfile to write any data to. However, the sender can select the button 284 to "Receive Return Receipts if logfile is missing". In this manner, the sender will continue to receive return receipts, but the data will not be logged or written into a logfile. Once the sender has selected the attachment return receipt properties shown in FIG. 2F, the sender clicks on the Save and Close Changes button 285, which takes the sender back to screen 230 shown in FIG. 2D. Again, the sender clicks on the Save and Close Changes button 229, which takes the sender to screen 300 shown in FIG. 3. The screen 300, similar to FIG. 1, shows a main menu bar 302 at the top that contains the main menu items File, Edit, View, Create, Actions, Text and Help. Further, the composition window 300 displays another bar 304 that contains a paper clip icon, reference number 308, which is the file attachment button 308 used for attaching a file in the e-mail, as well as the Log File Analyzer button 340. Also, there is a bar 306 which contains various formatting options (not specifically shown) for the e-mail note in FIG. 3. Further, there is a Delivery Options button 332, which contains various delivery options for the e-mail itself, along with other delivery options for the e-mail itself shown in the bar 312, such as, High Importance, Return Receipt, etc. The delivery options in bar 312 can provide an indication as to whether or not the originator has selected any return receipt options for the new e-mail itself. Further, screen 300 now shows in the body 330 above the message that the file "fileF.xls" is inserted or attached to the e-mail. When the sender is finished with the e-mail, the sender clicks on the Send button 310.

In another embodiment, the invention provides a method of obtaining one or more return receipts for a file attachment sent in an e-mail. The method comprises the steps of creating an e-mail in an e-mail composition window of an e-mail application, specifying one or more intended recipients for the e-mail, inserting at least one file attachment into the e-mail, selecting one or more return receipt properties for the at least one file attachment inserted into the e-mail before sending the e-mail, sending the e-mail to the one or more intended recipients specified for the e-mail, creating an e-mail data log file adapted to receive a set of details pertaining to the at least one file attachment inserted into the e-mail sent, and receiving one or more return receipts corresponding to each of the one or more return receipt properties selected for the at least one file attachment inserted into the e-mail sent. Preferably, the receiving one or more return receipts step further comprises the step of updating the set of details in the e-mail data log file; and sending e-mail notification to a sender if either a delivery failure or delivery discrepancy occurs for the at least one file attachment. The method further comprises the step of managing the set of details pertaining to the at least one file attachment in the e-mail data log file. Preferably, the one or more return receipt properties for the at least one file attachment are the same as mentioned hereinabove. Similarly, the set of details, namely the initial details and the return receipt details are the same as mentioned hereinabove.

Figure 2F:
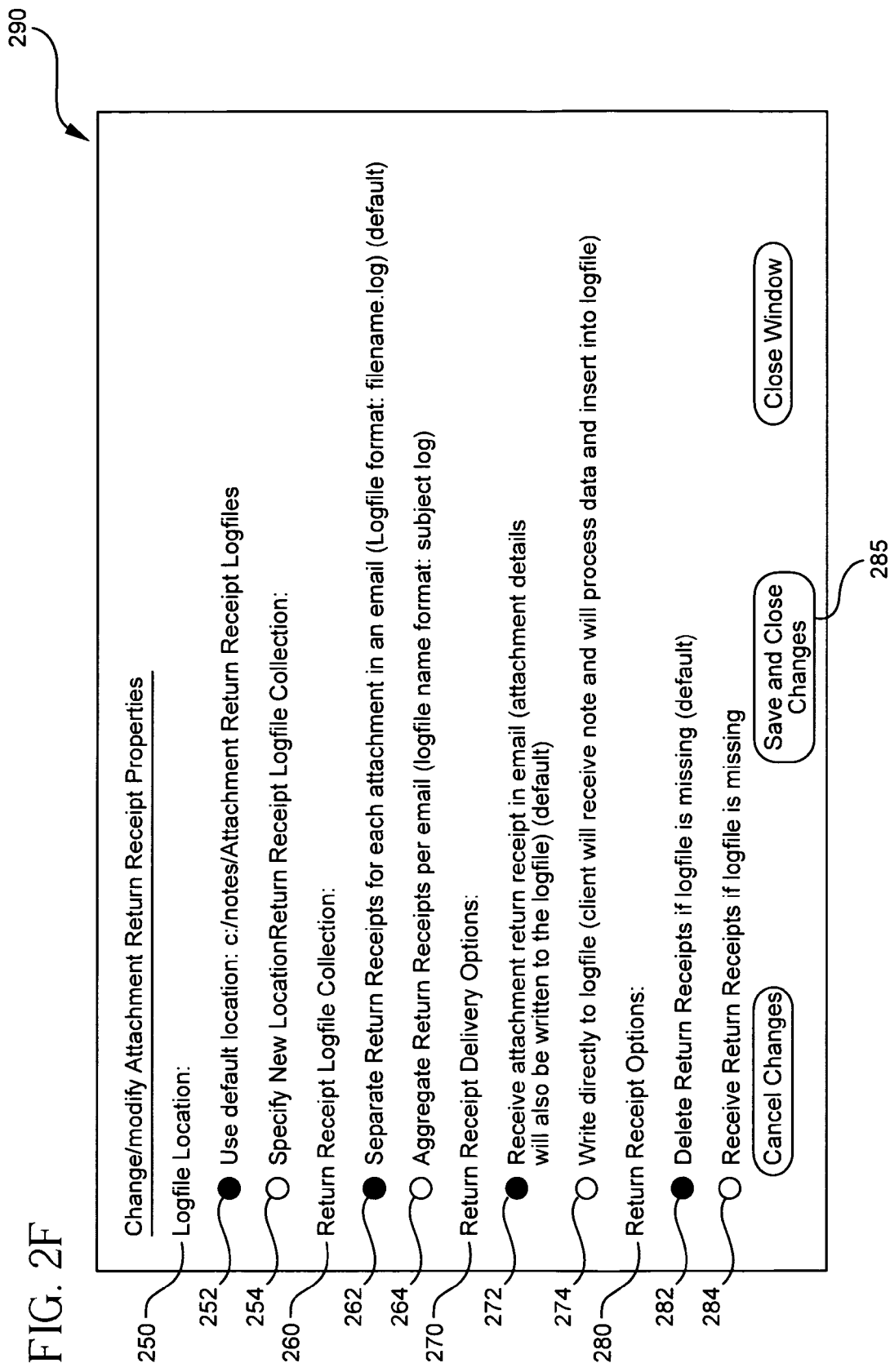
FIG. 2F is an illustration of a sub-window or sub-screen for modifying return receipt properties for a file attachment in a new e-mail composition window or screen in an e-mail application, in accordance with an embodiment of the present invention.
Figure 3:
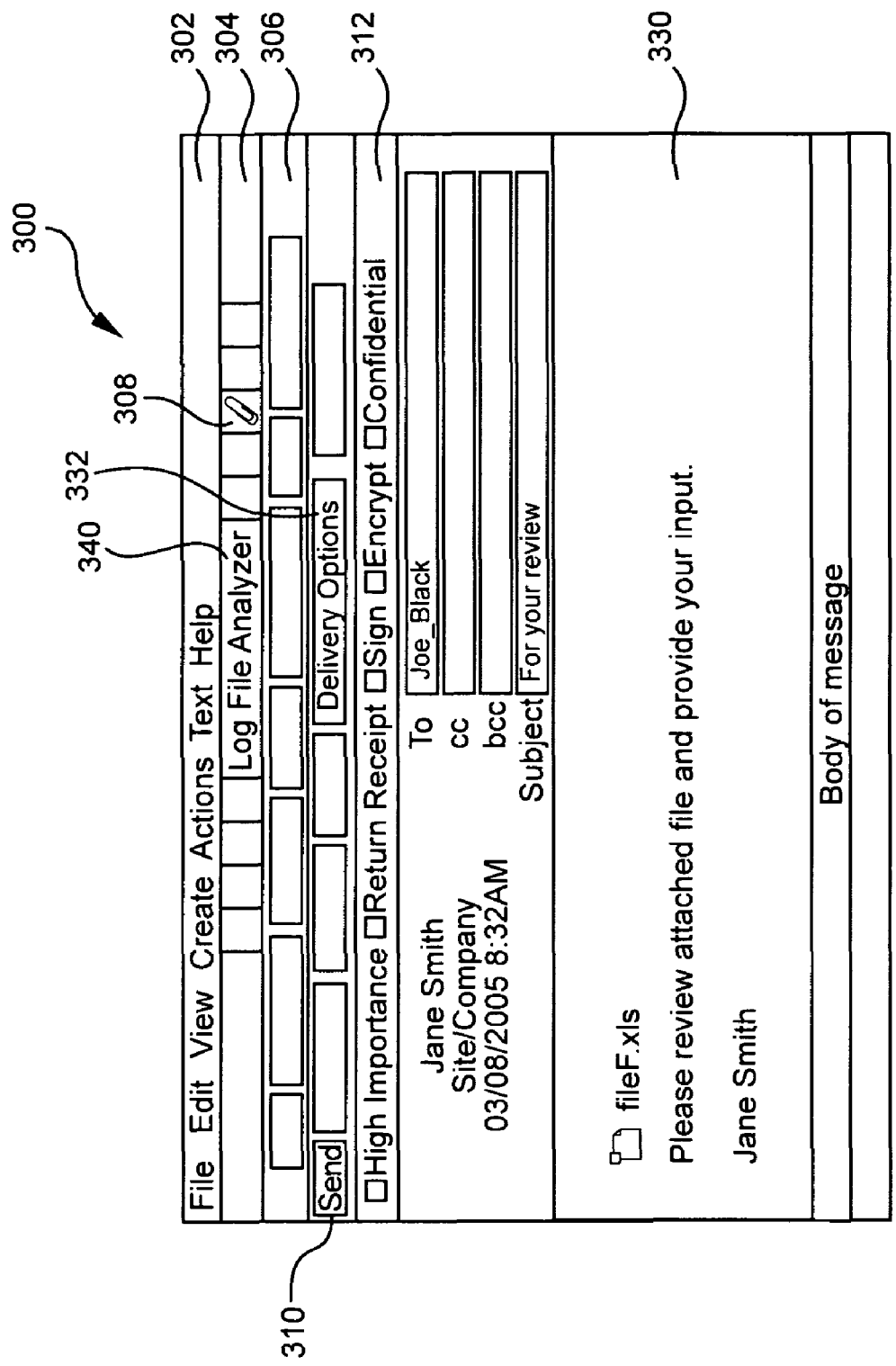
FIG. 3 is an illustration of a new e-mail containing a file attachment intended for a specified recipient, in accordance with an embodiment of the present invention.
Figure 4:
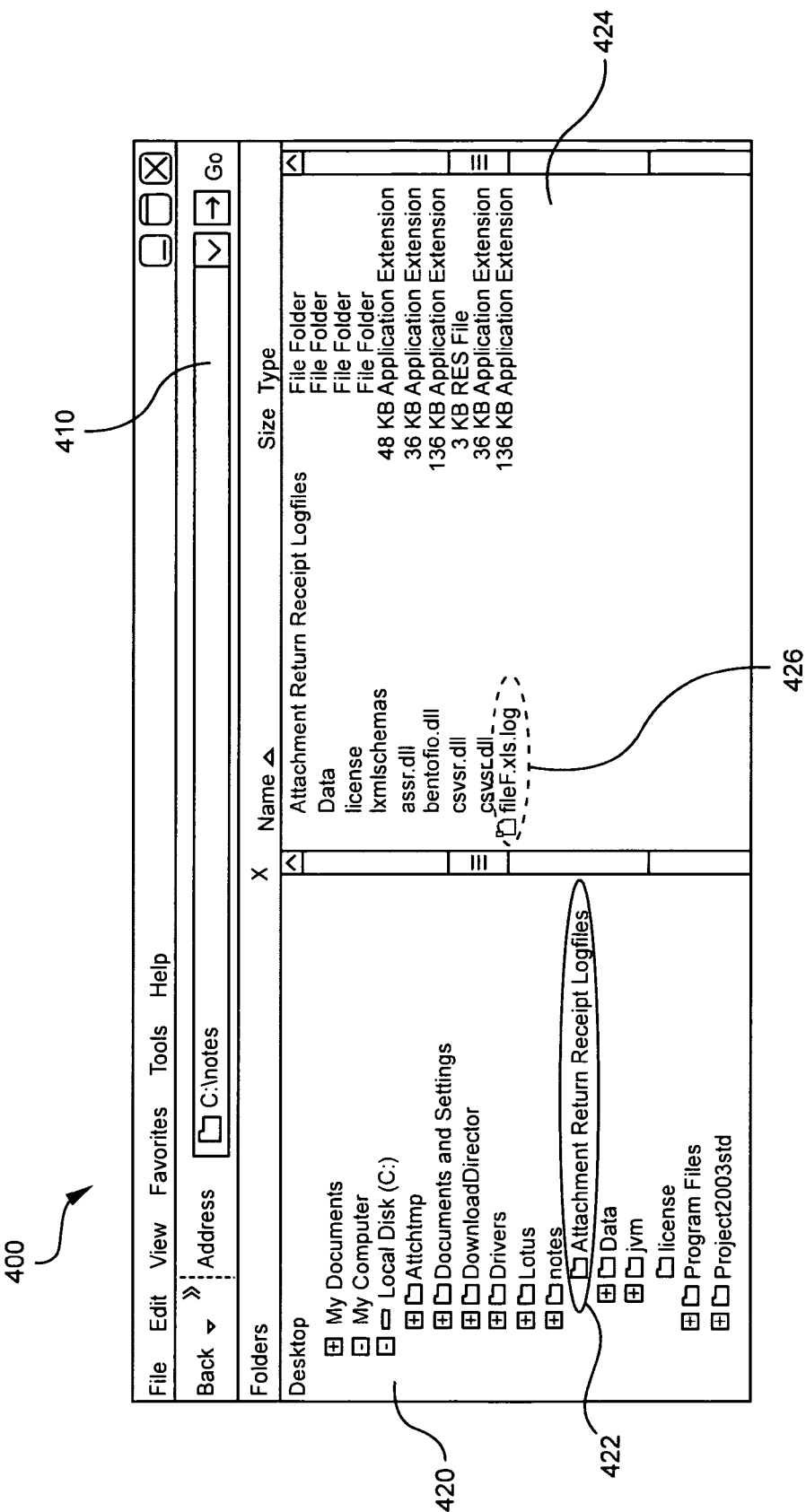
FIG. 4 is an illustration of a file attachment return receipt logfile created in a directory, in accordance with an embodiment of the present invention.

Reference is now made to FIGS. 4 through 7, which show different aspects of a logfile that is created for tracking one or more file attachments, in accordance with an embodiment of the invention. When a sender sends an e-mail, a logfile that is specified in FIG. 2F is created in the directory that is specified therein. In particular, if a sender selects the option button 274 for "Write directly to logfile" as shown in FIG. 2F, the sender will not receive any e-mail notification with respect to the one or more file attachments. However, the sender can access the logfile directly by looking up the logfile in the appropriate directory as per the Logfile Location 250 set forth in FIG. 2F. On the other hand, even if the sender receives e-mail notification for a file attachment, the sender can still access the logfile in the designated directory. Turning to FIG. 4, numeral 400 refers to the default logfile directory which contains logfiles corresponding to file attachments sent in e-mails. As shown in the screen 400, the directory 410 is the default location set forth in 252, namely "c:\notes", which contains (as shown in the sub-screen 420) the sub-folder 422 "Attachment Return Receipt Logfiles". When the sender clicks on the sub-folder 422 "Attachment Return Receipt Logfiles", the sub-folder 422 shows a list of all the files contained therein in sub-screen 424. In particular, sub-screen 424 shows the log file "fileF.xls.log" (numeral 426) which corresponds to the file attachment "fileF.xls" that was attached to the e-mail in FIG. 3. As such, the sender can click on the file "fileF.xls.log", which takes the sender to screen 500 of FIG. 5.

Figure 5:
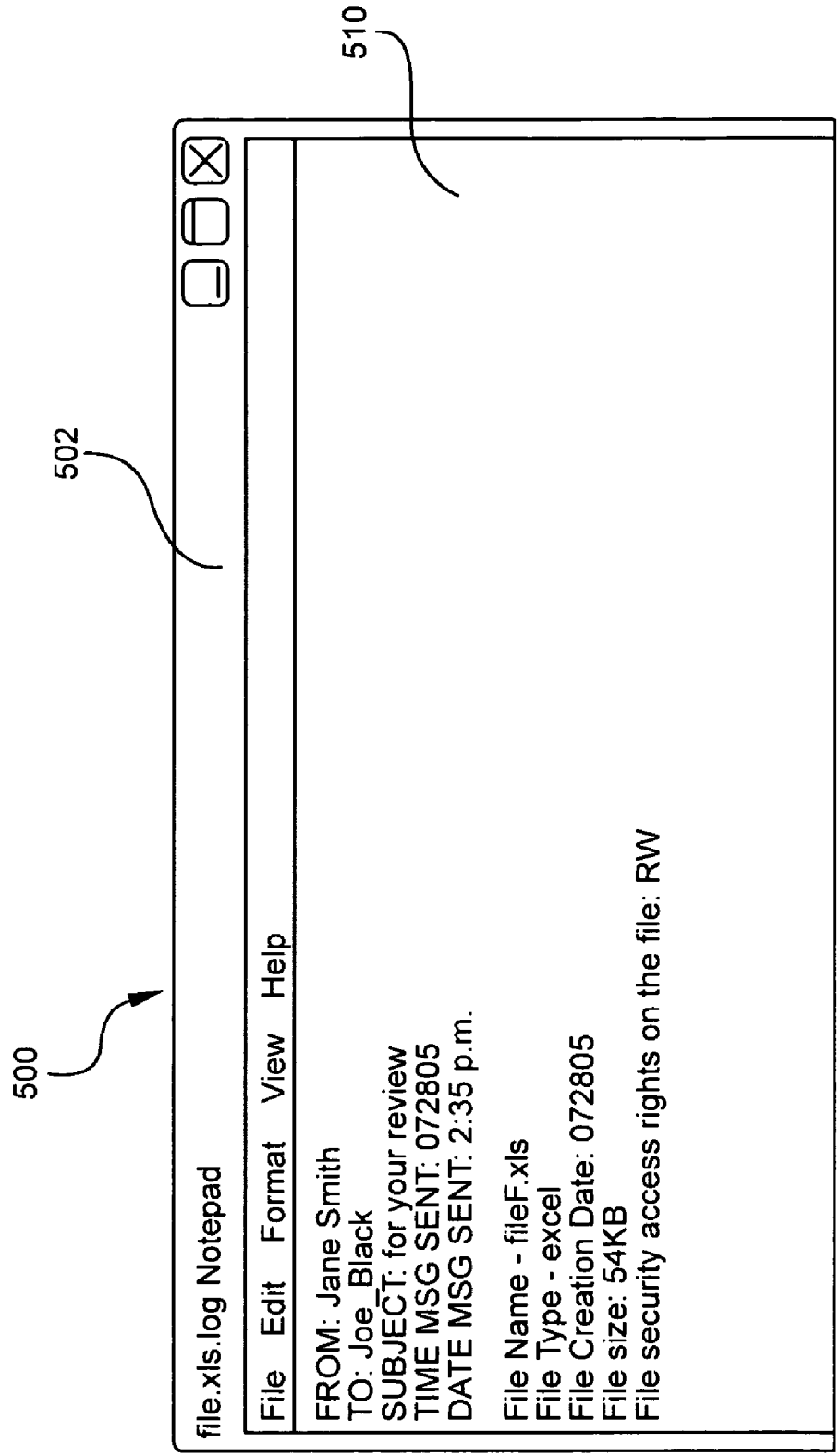
FIG. 5 is an illustration of the initial details of a file attachment written to a logfile, in accordance with an embodiment of the present invention.
Figure 6:
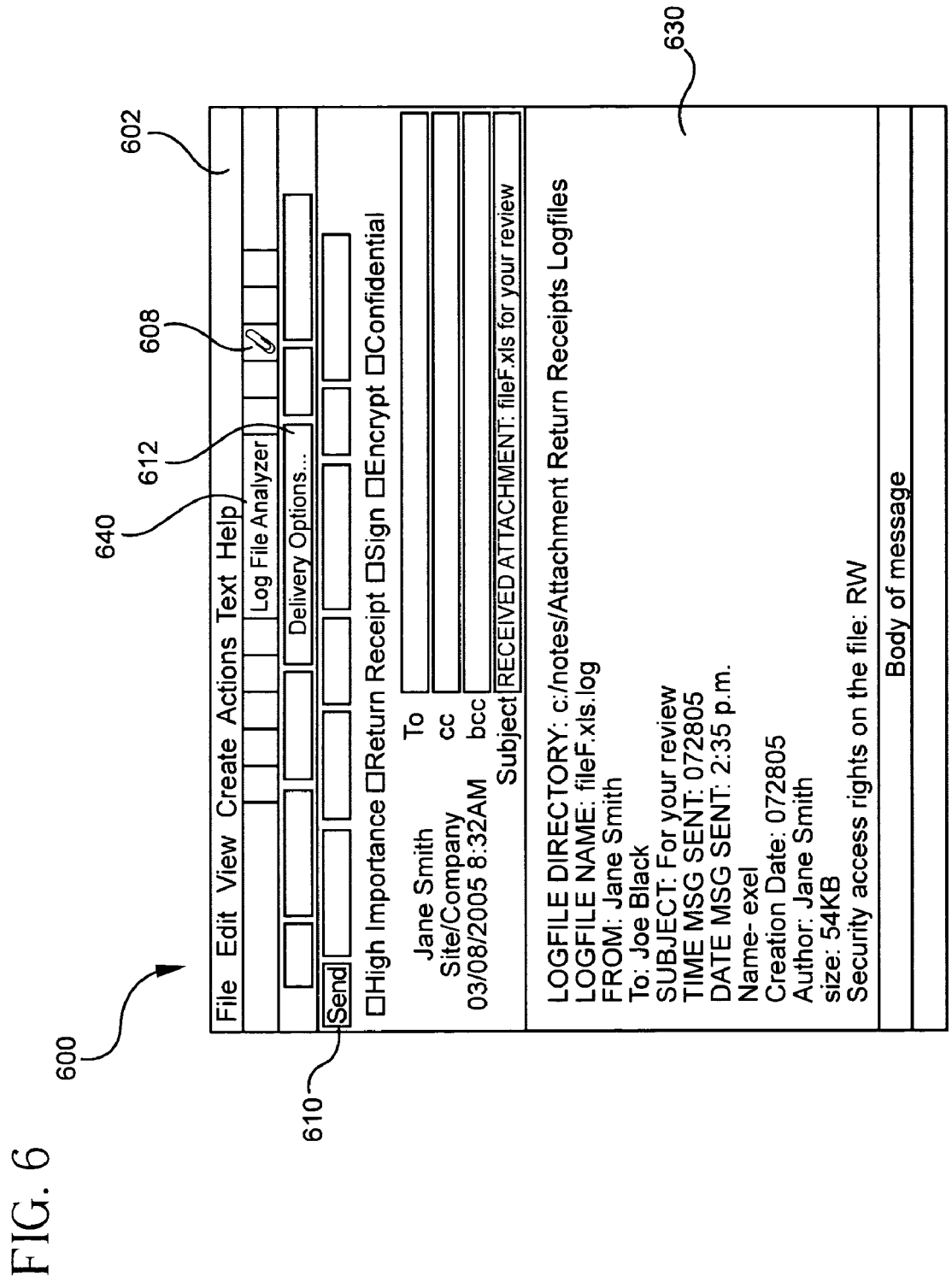
FIG. 6 is an illustration of the return receipt details for a file attachment received in an e-mail, in accordance with an embodiment of the present invention.
Figure 7:
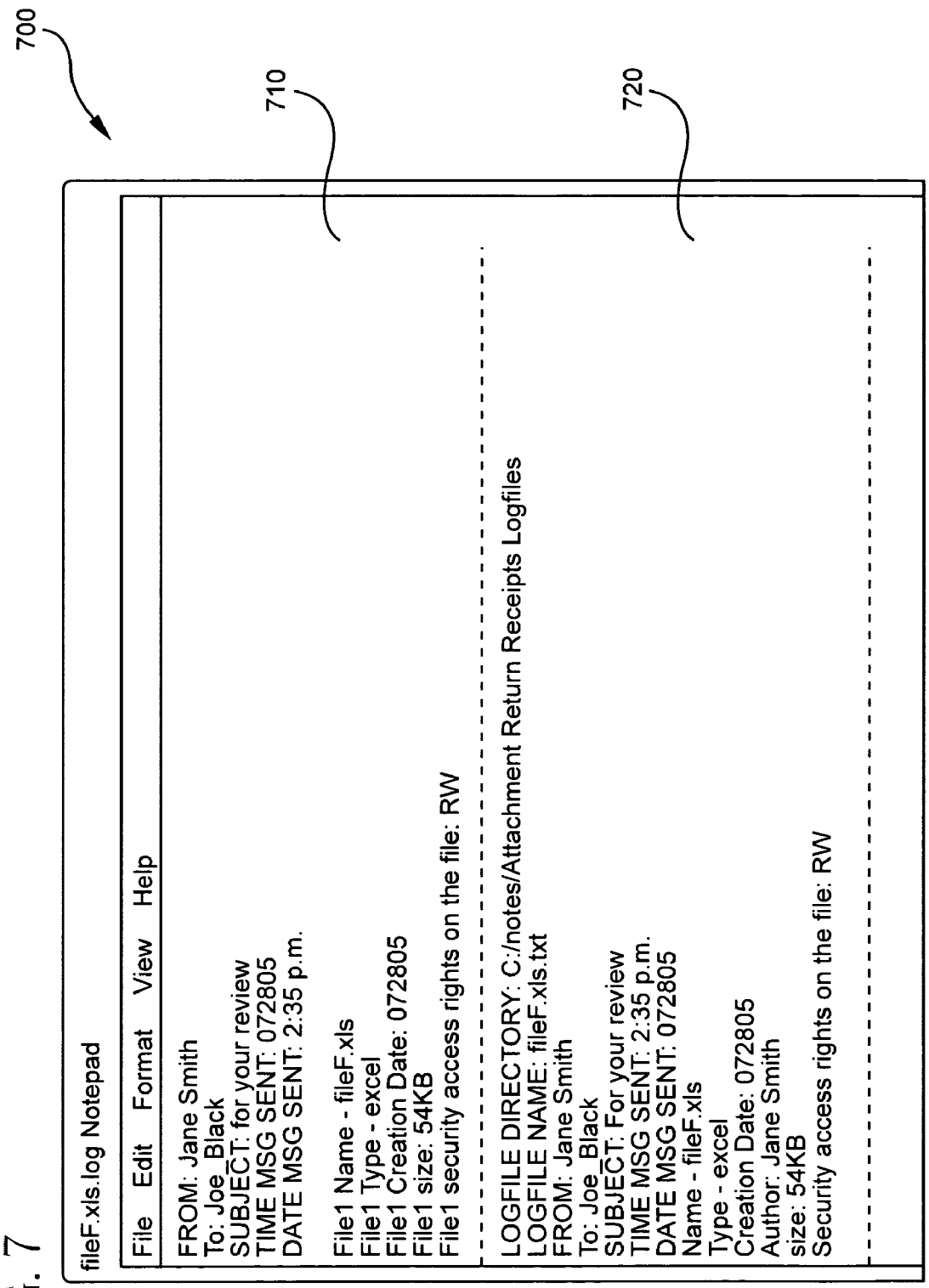
FIG. 7 is an illustration of the contents of an updated logfile showing initial and return receipt details for a file attachment sent in an e-mail, in accordance with an embodiment of the present invention.

As shown in FIG. 5, the file 502 "fileF.xls.log" represents the initial details written to a logfile for the e-mail that is sent as well as initial details for the file attachment "fileF.xls" sent in the e-mail in FIG. 3. The initial details shown in the body 510 include general e-mail details, such as, the sender (FROM), the recipient (TO), the subject of the e-mail (SUBJECT), the time the message was sent (TIME MSG SENT), the date the message was sent (DATE MSG SENT) as well as initial details pertaining to the file attachment itself, such as, the File Name, File Type, File Creation Date, File size and File security access rights on the file. Although, FIG. 5 only shows listed a few of the initial details, other initial details specified hereinabove can be included in the logfile. Further, when an e-mail containing a file attachment is sent, a return receipt will be sent to the sender or the sender's client only when the file attachment is viewed/opened or detached by a recipient. In particular, a logfile processor extracts the information from the one or more return receipts and writes and/or updates the information into the appropriate logfile. As mentioned previously with respect to FIG. 2F, the sender can choose to either receive return receipt for a file attachment by e-mail notification or have the return receipt information written directly to a logfile. On the other hand, FIG. 6 shows a file attachment return receipt e-mail notification that is sent to the sender. Turning to FIG. 6, numeral 600 shows a file attachment return receipt sent via e-mail in a sender's inbox. The screen 600 shows a main menu bar 602 at the top that contains the main menu. Further, screen 600 shows a paper clip icon, reference number 608, which is the file attachment button 608 used for attaching a file in the e-mail and a Send button 610 for sending the e-mail notification. In particular, the file attachment return receipt body 630 contains the location of the Logfile Directory in which the logfile is created, the Logfile Name of the created logfile, From, To, Subject, Time Msg Sent, Date Msg Sent, Name, Creation Date, Author, Size and Security access rights on the file. Although, FIG. 6 only shows listed a few of the return receipt details, other return receipt details specified hereinabove can be included in the return receipt details provided in 630. Also, as shown in FIG. 6, the sender can use the "Log File Analyzer" button 640 for managing or tracking any file attachment details in one or more log files that have been created. Further, as shown in FIG. 7, the logfile processor writes and/or updates the details or contents of the logfile 700 in the specified directory, for instance, every few hours or on a regular time period that is predefined. As shown, the logfile 700 not only shows in 710 the initial details of the e-mail and the file attachment when the e-mail was initially sent by the sender, but the logfile body 720 also shows the return receipt details for the file attachment, such as, logfile directory location (c:/notes/Attachment Return Receipts Logfiles) and logfile name (fileF.xls.log). In addition, the logfile body 720 can include (not shown in 720) other return receipt details for the e-mail and any file attachment(s), such as when the file attachment was either viewed/opened or detached by a recipient.

Figure 8:
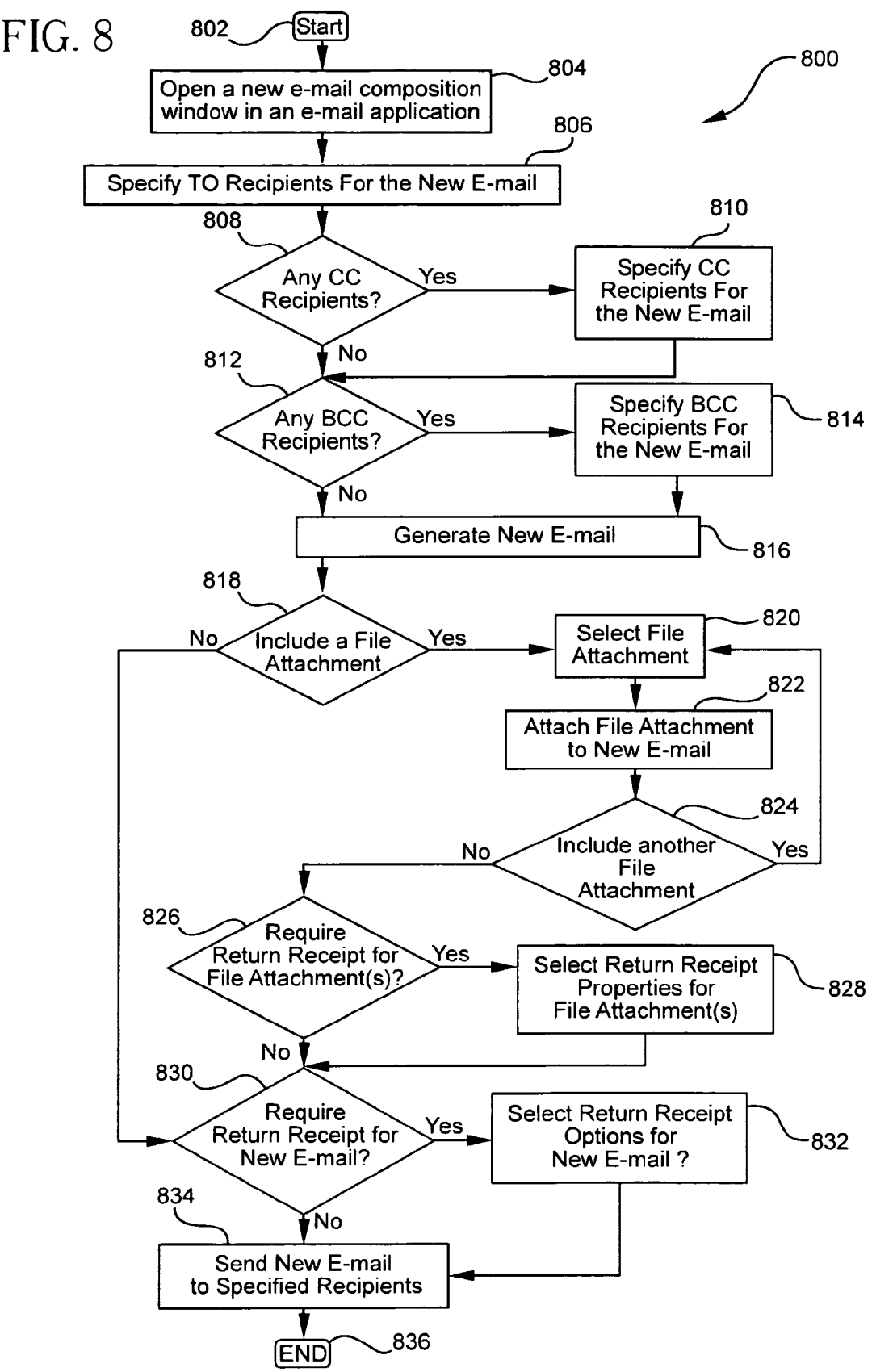
FIG. 8 is a flowchart depicting a method of tracking a file attachment in an e-mail created in an e-mail application, in accordance with an embodiment of the present invention.
Figure 9A:
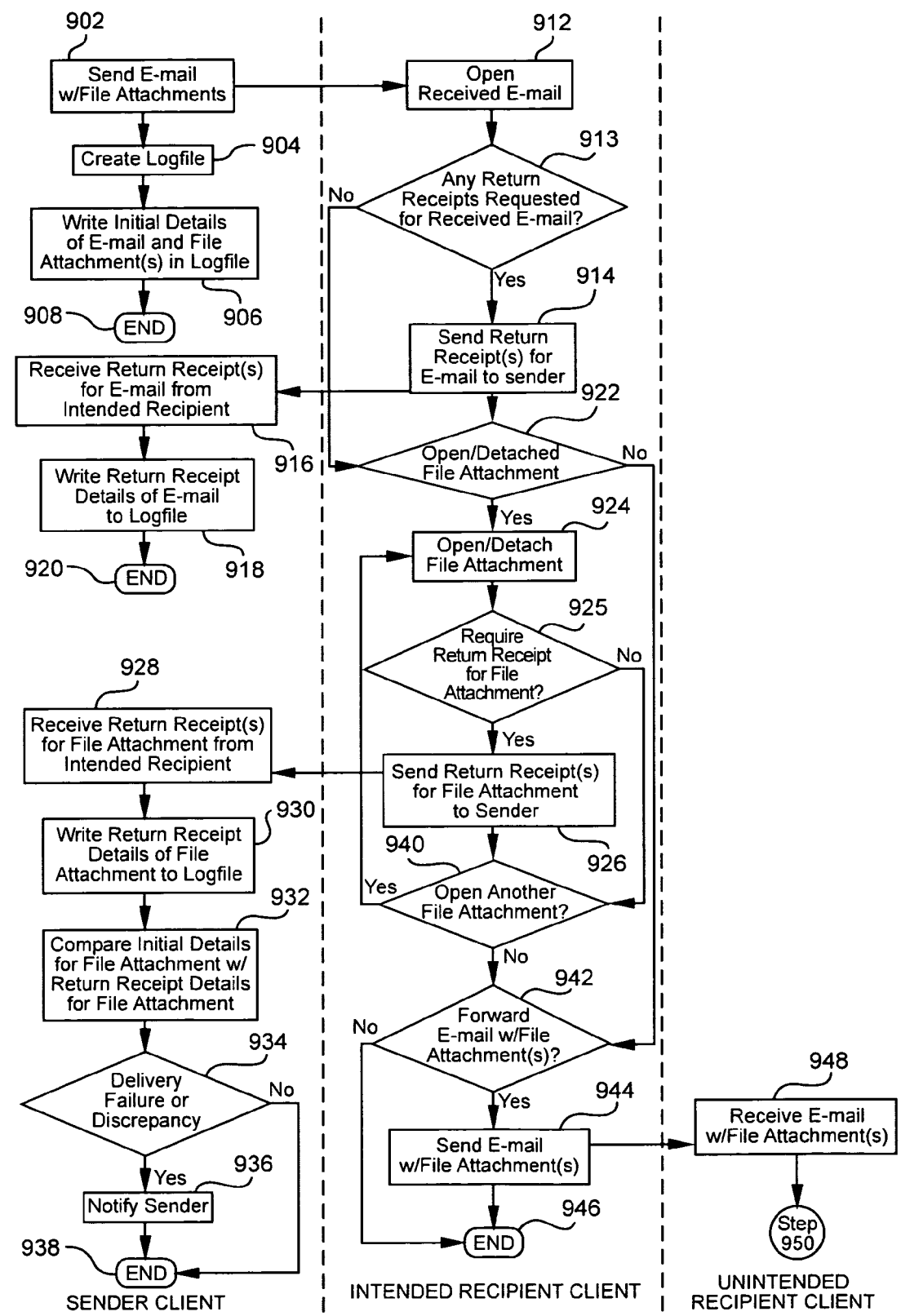
FIGS. 9A-9B are flowcharts depicting a method of obtaining return receipts for a file attachment sent in an e-mail, in accordance with an embodiment of the present invention.
Figure 9B:
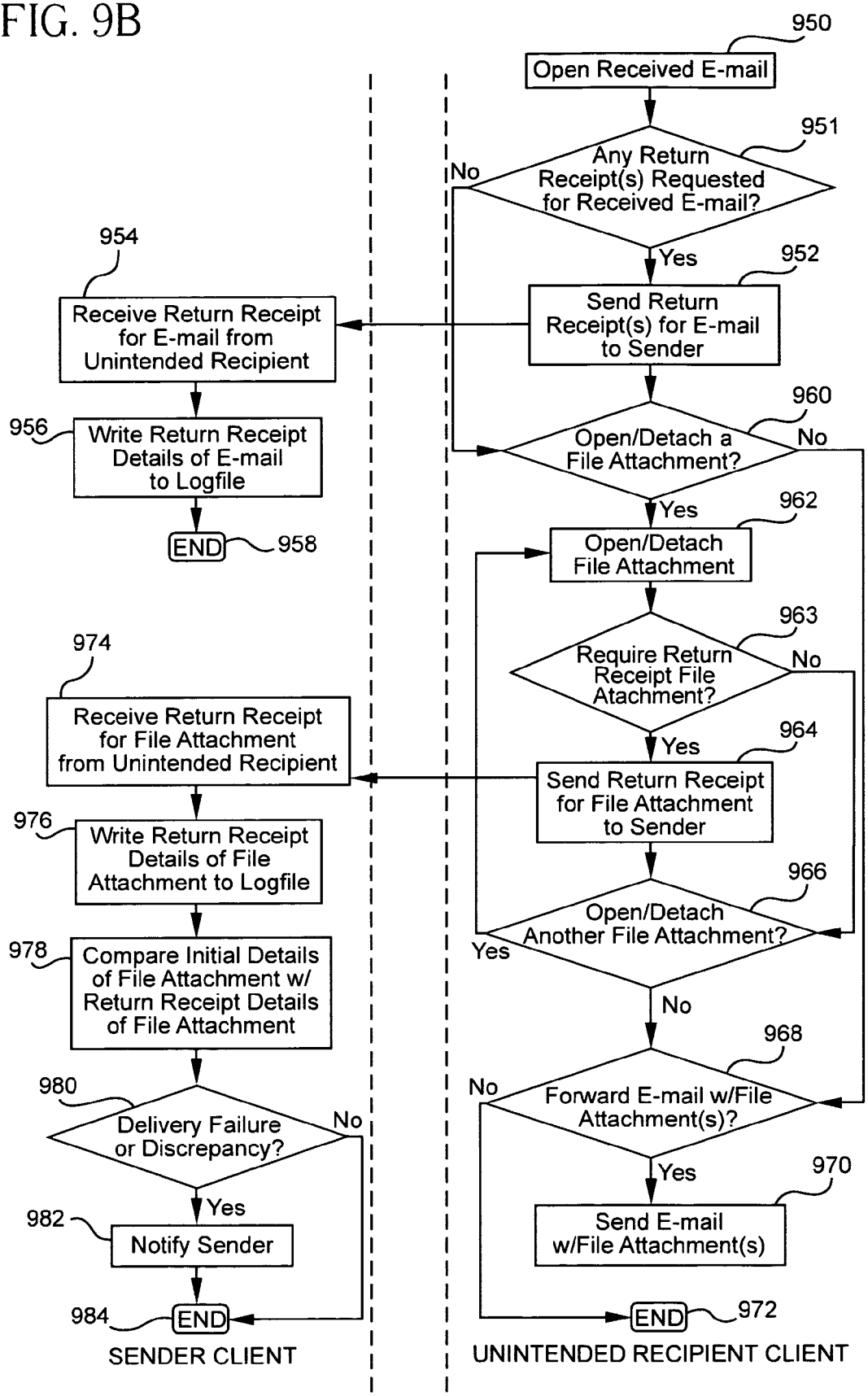

Reference is now made to FIGS. 8, 9A and 9B, which outline the steps involved in different aspects of tracking a file attachment sent in an e-mail, in accordance with an embodiment of the invention. Turning to FIG. 8, numeral 800 outlines a method of tracking a file attachment sent in an e-mail. The method starts at step 802 with the sender opening in step 804 a new e-mail composition window in an e-mail application and specifying in step 806 the To Recipients for the new e-mail. Further, if there are any cc recipients to be added in step 808, the sender specifies cc recipients for the new e-mail in step 810, which takes the sender to step 812. If there are no cc recipients to be added in step 808, the sender determines if there are any bcc recipients to be added in step 812, and if so, the bcc recipient group recipients are added to the new e-mail in step 814. Preferably, the sender generates a message for the e-mail in step 816. Further, the sender determines in step 818 whether the sender wants to include a file attachment in the e-mail. If no file attachment is to be included the method moves onto step 830, explained herein below. However, if the sender wants to include a file attachment, the sender selects a file attachment in step 820 and attaches the file attachment in the new e-mail in step 822. Further, the sender determines whether to include another file attachment in step 824, and if so, the sender selects another file attachment in step 820 and attaches the file attachment into the e-mail in step 822. When the sender is finished inserting or attaching file attachments, the sender determines if a return receipt is required for the file attachment in step 826. If the sender determines that a return receipt is required, then the sender selects the return receipt properties for the one or more file attachments in step 828. On the other hand, if the sender does not require a return receipt for the file attachment or if the sender has selected the return receipt properties for the file attachments or if the sender does not attach any file attachments in step 818, the sender determines in step 830 whether a return receipt is required for the e-mail itself and, if so, the sender selects the desired return receipt options for the e-mail in step 832. If no return receipt is desired for the e-mail itself, the sender sends the e-mail to the specified recipients in step 834, which ends the process at step 836.

FIGS. 9A and 9B outline the steps involved in obtaining return receipts for one or more file attachments that are sent by a sender in an e-mail. As shown in FIGS. 9A and 9B, the process starts at step 902 when the sender sends an e-mail with any file attachments to one or more intended recipients. The sender client or machine sends the e-mail with the file attachments in step 902 to the intended recipient client or machine. Further, the sender client creates a logfile in step 904, and writes in step 906 initial details of the e-mail and any file attachments in the logfile created, and ends in step 908 when the initial details have been written into the logfile. When the intended recipient client receives the e-mail, and when the e-mail is opened by an intended recipient in step 912, a determination is made by the intended recipient client whether any return receipts are requested for the received e-mail in step 913. If so, the intended recipient client sends a return receipt for the e-mail to the sender client in step 914. The sender client receives the return receipt for the e-mail in step 916 and writes in the logfile the return receipt details pertaining to the e-mail in step 918, which is completed and ends at step 920. If any return receipt is not requested for the e-mail and/or after a return receipt for the e-mail is sent to sender, the intended recipient client determines whether the recipient wants to open or detach file attachment in step 922. If so, the file attachment is opened or detached in step 924. The intended recipient client determines in step 925 if a return receipt is required for the file attachment that is opened or detached. If yes, a return receipt for the file attachment is sent to the sender in step 926. If no return receipt is required, the next step is determining if another file attachment is to be opened or detached in step 940. If so, the steps 924, 925, 926 and 940 are repeated until all file attachment have been opened or detached. The sender client receives in step 928 the return receipts for the one or more file attachments opened or detached by an intended recipient. Further, the sender client writes to the logfile the return receipt details of the file attachment in step 930. Additionally, the sender client compares the initial details for a file attachment with the return receipt details for that file attachment in step 932. The sender client determines whether there is a delivery failure or a delivery discrepancy in step 934 and, if so, the sender client notifies sender in step 936. If there is no delivery failure or delivery discrepancy, and/or after the sender client notifies sender, the process ends at step 938. Turning to the intended recipient client, if a recipient decides not to open or detach a file attachment in step 922 or after the recipient is done opening or detaching file attachments in step 940, the intended recipient client determines if recipient wants to forward an e-mail received with a file attachment in step 942. If "no", then the process ends at step 946. If "yes", the intended recipient client sends the e-mail with the file attachment to an unintended recipient specified by the intended recipient in step 944, which is received by the unintended recipient client in step 948.

Further, as shown in FIG. 9B, when the unintended recipient opens the received e-mail in step 950 that has been forwarded in step 948, the unintended recipient client determines in step 951 whether any return receipts are requested for the e-mail, if "no", then the process moves on to step 960. However, if a return receipt is requested for the e-mail in step 951, then the unintended recipient client sends a return receipt to the sender client in step 952. The sender client receives the return receipt from the unintended recipient client in step 954 and writes to the logfile for that file attachment further return receipt details of the e-mail that was forwarded to an unintended recipient and ends at 958. Turning to the unintended recipient client, if the unintended recipient wants to open or detach a file attachment in step 960, the file attachment is opened or detached in step 962. The unintended recipient client determines in step 963 if a return receipt is required for the file attachment that is opened or detached. If yes, a return receipt for the file attachment is sent to the sender in step 964. If no return receipt is required, the next step is determining if another file attachment is to be opened or detached in step 966. If so, the steps 962, 963, 964 and 966 are repeated until all file attachments have been opened or detached. The sender client receives in step 974 the return receipts for the one or more file attachments opened or detached by an unintended recipient. Further, the sender client writes to the logfile the return receipt details of the file attachment in step 976. Additionally, the sender client compares the initial details for a file attachment with the return receipt details for that file attachment in step 978. The sender client determines whether there is a delivery failure or a delivery discrepancy in step 980 and, if so, the sender client notifies sender in step 982. If there is no delivery failure or delivery discrepancy, and/or after the sender client notifies sender and the process ends at 984. Turning to the unintended recipient client, if a recipient decides not to open or detach a file attachment in step 960 or after the recipient is done opening or detaching file attachments in step 966, the unintended recipient client determines if the unintended recipient wants to forward an e-mail received with a file attachment in step 968. If "no", then the process ends at step 972. If "yes", the unintended recipient client sends the e-mail with the file attachment to another unintended recipient specified by the unintended recipient in step 970.

In yet another embodiment, the invention provides a computer program product for tracking a file attachment inserted into an e-mail that is sent. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to create in an e-mail in an e-mail application addressed to one or more intended recipients, the first program instructions including instructions to insert one or more file attachments in the e-mail and to select one or more return receipt properties for any of the one or more file attachments inserted into the e-mail. The computer program product further includes second program instructions to write to an e-mail data log file initial details for each of the one or more file attachments inserted into the e-mail when the e-mail is sent, the second program instructions including instructions to update the e-mail data log file. Further, preferably, the second program instructions to update further comprises instructions to write to the e-mail data log file return receipt details for the one or more file attachments inserted into the e-mail sent. The computer program product also includes third program instructions to notify a sender when either a delivery failure or a delivery discrepancy occurs for any of the one or more file attachments sent to any of the one or more intended recipients. The third program instructions to notify further includes instructions to compare the initial details of each of the one or more file attachments in the e-mail data log file with the return receipt details of each of the one or more file attachments in the e-mail data log file to check for either the delivery failure or the delivery discrepancy, and instructions to send e-mail notification to the sender if either the delivery failure or the delivery discrepancy occurs. Preferably, the computer program product includes fourth program instructions to manage the e-mail data log file, the fourth program instructions being stored on the medium. More preferably, the first, second, third and fourth program instructions are stored on the medium. Preferably, the one or more return receipt properties for the file attachments are the same as mentioned hereinabove. Similarly, the set of details, namely the initial details and the return receipt details are the same as those mentioned hereinabove.

Figure 10:
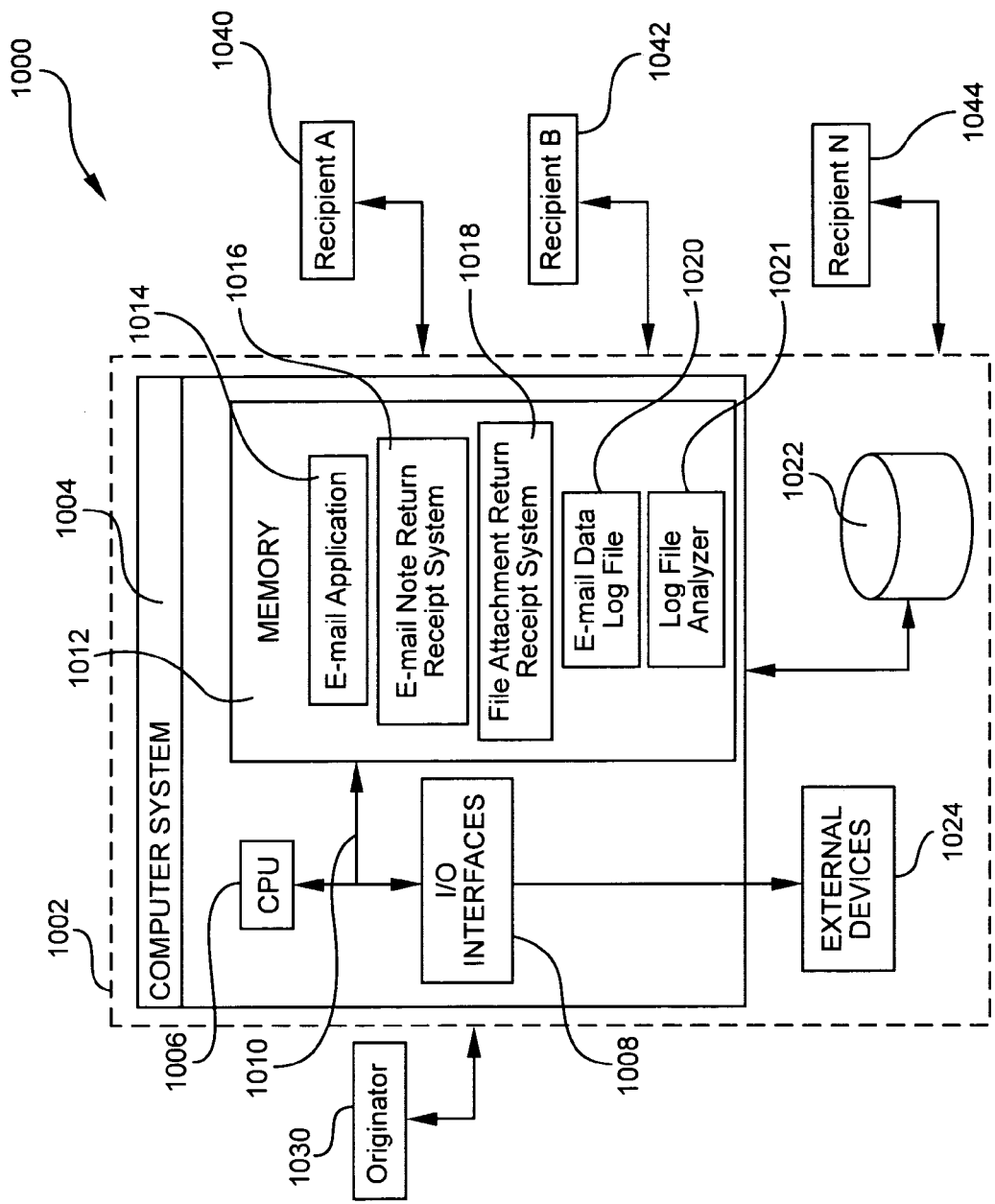
FIG. 10 is a schematic block system diagram illustrating a computer program product for tracking a file attachment sent in an e-mail, in accordance with an embodiment of the invention.

Referring now to FIG. 10, there is illustrated a file attachment return receipt system 1000, according to the present invention. As depicted, system 1000 includes a computer infrastructure 1002, which is intended to represent any type of computer architecture that is maintained in a secure environment (i.e., for which access control is enforced). As shown, infrastructure 1002 includes a computer system 1004 that typically represents a server or the like. It should be understood, however, that although not shown, other hardware and software components (e.g., additional computer systems, routers, firewalls, etc.) could be included in infrastructure 1002.

In general, an originator or sender 1030 interfaces with infrastructure 1002 to electronically track a file attachment that is sent in an e-mail. Similarly, one or more Recipient clients A, B and C (designated by numerals 1040, 1042 and 1044) can interface with infrastructure 1002 to provide return receipts that are requested by the sender for one or more file attachments. To this extent, infrastructure 1002 provides a secure environment. In general, the parties could access infrastructure 1002 directly, or over a network via interfaces (e.g., web browsers) loaded on computerized devices (e.g., personal computers, laptops, handheld devices, etc. not shown in FIG. 10). In the case of the latter, the network can be any type of network such as the Internet, a local area network (LAN), a wide area network (WAN), a virtual private network (VPN), etc. In any event, communication with infrastructure 1002 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computer system 1004 is shown to include a CPU (hereinafter "processing unit 1006"), a memory 1012, a bus 1010, and input/output (I/O) interfaces 1008. Further, computer system 1000 is shown in communication with external I/O devices/resources 1024 and storage system 1022. In general, processing unit 1006 executes computer program code, such as the File Attachment Return Receipt system 1018, which is stored in memory 1010 and/or storage system 1022. Similarly, processing unit 1006 executes the computer program code for the E-mail Application 1014, E-mail Note Return Receipt System 1016, the E-Mail Data Log File 1020 and the Log File Analyzer 1021. While executing computer program code, processing unit 1006 can read and/or write data, to/from memory 1012, storage system 1022, and/or I/O interfaces 1008. Bus 1010 provides a communication link between each of the components in computer system 1000. External devices 1024 can comprise any devices (e.g., keyboard, pointing device, display, etc.) that enable a user to interact with computer system 1000 and/or any devices (e.g., network card, modem, etc.) that enable computer system 1000 to communicate with one or more other computing devices.

Computer infrastructure 1002 is only illustrative of various types of computer infrastructures for implementing the invention. For example, in one embodiment, computer infrastructure 1002 comprises two or more computing devices (e.g., a server cluster) that communicate over a network to perform the various process steps of the invention. Moreover, computer system 1000 is only representative of various possible computer systems that can include numerous combinations of hardware. To this extent, in other embodiments, computer system 1000 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1006 may comprise a single processing unit, or be distributed across one or more processing units in one or more locations, e.g., on a client and server. Similarly, memory 1012 and/or storage system 1022 can comprise any combination of various types of data storage and/or transmission media that reside at one or more physical locations. Further, I/O interfaces 1008 can comprise any system for exchanging information with one or more external devices 1024. Still further, it is understood that one or more additional components (e.g., system software, math co-processing unit, etc.) not shown in FIG. 10 can be included in computer system 1000. However, if computer system 1000 comprises a handheld device or the like, it is understood that one or more external devices 1024 (e.g., a display) and/or storage system(s) 1022 could be contained within computer system 1000, not externally as shown. Storage system 1022 can be any type of system (e.g., a database) capable of providing storage for information under the present invention. To this extent, storage system 1022 could include one or more storage devices, such as a magnetic disk drive or an optical disk drive. In another embodiment, storage system 1022 includes data distributed across, for example, a local area network (LAN), wide area network (WAN) or a storage area network (SAN) (not shown). Although not shown, additional components, such as cache memory, communication systems, system software, etc., may be incorporated into computer system 1000.

Further yet, in another embodiment of the invention, there is provided a method for deploying computing infrastructure, comprising integrating computer-readable code into a computing system, wherein the code in combination with the computing system is capable of performing a process of tracking a file attachment sent in an e-mail. The process comprises attaching one or more file attachments to an e-mail created in an e-mail application, selecting one or more return receipt properties for the one or more file attachments attached to the e-mail, sending the e-mail to one or more intended recipients specified for the e-mail, and writing to an e-mail data log file a set of details pertaining to the one or more file attachments attached to the e-mail sent, such that a sender is able to track in the e-mail data log file any one of the one or more file attachments attached to the e-mail sent. Further, the process comprises notifying the sender when either a delivery failure or a delivery discrepancy occurs for any of the one or more file attachments attached to the e-mail sent to any of the one or more intended recipients and managing the set of details pertaining to the one or more file attachments in the e-mail data log file. Preferably, the attaching step further comprises opening an e-mail composition window in an e-mail application for creating the e-mail, and specifying one or more of the intended recipients for at least one of a plurality of recipient groups for the e-mail. Preferably, the writing step further comprises updating the set of details written to the e-mail data log file, and wherein the set of details comprises one or more of: initial details for the one or more file attachments sent in the e-mail and return receipt details for the one or more file attachments sent in the e-mail. More preferably, the updating step further comprises comparing the initial details of each of the one or more file attachments in the e-mail data log file with the return receipt details of each of the one or more file attachments in the e-mail data log file to check for either the delivery failure, the delivery discrepancy, a successful delivery or an opening of any of the one or more file attachments, and sending e-mail notification to the sender if either the delivery failure or the delivery discrepancy occurs.

Preferably, the one or more return receipt properties for the one or more file attachments comprises at least one of log file location, return receipt log file collection, return receipt delivery options, return receipt client options, read receipt from an intended recipient, detach receipt from an intended recipient, read receipt from an unintended recipient, and detach receipt from an unintended recipient. Further, the initial details of the e-mail data log file preferably comprise at least one of names and e-mail addresses of each of the one or more intended recipients, subject, time and date when the e-mail is sent, name and type of each of the one or more file attachments, creation date and author of each of the one or more file attachments, size of each of the one or more file attachments, and security access rights for each of the one or more file attachments. More preferably, the return receipt details of the e-mail data log file comprise at least one of logfile directory location, logfile name, name and e-mail address of each recipient from the one or more intended recipients to whom the e-mail is delivered, subject, time and date when the e-mail is delivered, name, type and size of each of the one or more file attachments delivered, name and e-mail address of any intended recipient to whom the one or more file attachments in the e-mail is not delivered, name, type and size of each of the one or more file attachments not delivered, failed attempt to deliver the e-mail to any of the one or more intended recipients specified, name, e-mail address, subject, time and date when the e-mail is re-sent, name and e-mail address of an intended recipient who opens any of the one or more file attachments, time and date when the one or more file attachments is opened by an intended recipient, name, type and size of each of the one or more file attachments opened by an intended recipient, name and e-mail address of an intended recipient who detaches any of the one or more file attachments, name and e-mail address of an unintended recipient who opens the e-mail with the one or more file attachments, time and date when the one or more file attachments is opened by an unintended recipient, name, type and size of each of the one or more file attachments opened by an unintended recipient, name and e-mail address of an unintended recipient who detaches the e-mail with the one or more file attachments, name, type and size of each of the one or more file attachments detached, and time and date when e-mail is detached by an unintended recipient.

Accordingly, any of the components of the present invention can be deployed, managed, serviced by a service provider who offers to track a file attachment sent in an e-mail. Preferably, the invention provides a business method that performs the process steps of the invention on a subscription, advertising and/or fee basis. In particular, a service provider, such as a solution integrator could offer to track a file attachment sent in an e-mail. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking a file attachment sent in an e-mail message, said method comprising the steps of:

attaching the file attachment to the e-mail message created by a sender using an e-mail application running on a sender e-mail client machine, wherein the e-mail application enables the sender to interact with the sender e-mail client machine such that the sender configures said tracking;

determining that the sender requires a return receipt for the file attachment from a recipient of the e-mail message, wherein the recipient is specified by a responding recipient list provided by the sender, wherein the responding recipient list is at least one e-mail address selected from a group consisting of a To group recipients of the e-mail message, a Cc group recipients of the e-mail message, a Bcc group recipients of the e-mail message, an individual recipient of the e-mail message, and combinations thereof, and wherein the return receipt comprises respective delivery values of file attachment status parameters and respective delivery values of e-mail message status parameters;

selecting values for one or more return receipt properties for the file attachment attached to said e-mail message pursuant to a respective input from the sender via the e-mail application for each return receipt property of the one or more return receipt properties such that the sender configures a manner in which said tracking is performed, wherein said one or more return receipt properties are selected from a group consisting of a logfile location property, a logfile collection property, a return receipt delivery option property, and a return receipt client option property;

sending said e-mail message having the file attachment attached thereto to a recipient e-mail client machine corresponding to the recipient specified for said e-mail message, wherein the e-mail message requires, from the recipient e-mail client machine corresponding to the recipient specified in the responding recipient list, the return receipt comprising the respective delivery values of the file attachment status parameters and the respective delivery values of the e-mail message status parameters generated by the recipient e-mail client machine;

writing, to an e-mail data log file in a logfile directory indicated by a value of the logfile location property of said one or more return receipt properties on said sender e-mail client machine, a first set of details comprising respective initial values of the file attachment status parameters and respective initial values of the e-mail message status parameters at a time of said sending; and recording a second set of details to said e-mail data log file, the second set of details comprising respective delivery values of the file attachment status parameters and respective delivery values of the e-mail message status parameters such that said second set of details describes whether or not said e-mail message and the file attachment have been successfully delivered to the recipient specified in the responding recipient list, responsive to receiving the return receipt from the recipient e-mail client machine corresponding to the recipient, wherein the return receipt comprises the respective delivery values for the file attachment status parameters and the respective delivery values of the e-mail message status parameters at a time when the e-mail message had been delivered to the recipient e-mail client machine subsequent to said sending, wherein the file attachment status parameters are selected from a group comprising a file name, a file type, a file creation date, a file size, a file access permission, and combinations thereof, and wherein the e-mail message status parameters are selected from a group comprising the sender, the recipient, a subject, a time message sent, and a date message sent, and wherein the e-mail data log file further comprises the logfile directory and a name of the e-mail data log file.

2. The method according to claim 1, further comprising the steps of:

determining that either a delivery failure or a delivery discrepancy had occurred for the file attachment attached to said e-mail message sent to the recipient as a result of:

comparing the respective initial values of the e-mail message status parameters stored in the first set of details from said writing with the respective delivery values of the e-mail message status parameters stored as the second set of details from said recording of the e-mail data log file for the file attachment, wherein the e-mail message status parameters in the first set of details are respectively corresponding to the e-mail message status parameters in the second set of details;

comparing the respective initial values of the file attachment status parameters stored in the first set of details from said writing with the respective delivery values of the file attachment status parameters stored as the second set of details from said recording of the e-mail data log file for the file attachment, wherein the file attachment status parameters in the first set of details are respectively corresponding to the file attachment status parameters in the second set of details;

discovering that at least one initial value of the e-mail message status parameters in the first set of details is different from a corresponding delivery value of the e-mail message status parameters in the second set of details or that at least one initial value of the file attachment status parameters in the first set of details is different from a corresponding delivery value of the file attachment status parameters in the second set of details; and sending an error notification to said sender, the error notification indicates that either the delivery failure or the delivery discrepancy had occurred for the file attachment attached to said e-mail message sent to the recipient, wherein the error notification is sent via another e-mail, such that the sender determines whether or not to resend the e-mail message and the file attachment to the recipient based on the error notification.

3. The method according to claim 2, wherein a first value of the logfile location property is selected from a first group consisting of a predefined default location and a new location specified by the sender;

a second value of the logfile collection property is selected from a second group consisting of a separate collection and an aggregate collection, the separate collection value representing that a respective return receipt for each file attachment in the e-mail message is created as a respective file attachment log file, and the aggregate collection value representing that a return receipt for all file attachments in the e-mail message is created as the e-mail data log file;

a third value of the return receipt delivery option property is selected from a third group consisting of in-email and log-file, the in-mail value representing that the sender receives a return receipt arrival notification mail from the e-mail application in the sender e-mail client machine when the return receipt arrives from the recipient, and the log-file value represents that the return receipt is written directly to the e-mail data log file for processing; and a fourth value of the return receipt client option property is selected from a fourth group consisting of a delete and a receive, the delete value represents that the sender deletes the return receipt if the e-mail data log file is missing, and the receive value represents that the sender receives the return receipt even if the e-mail data log file is missing.

4. The method according to claim 2, wherein said one or more return receipt properties for said one or more file attachments further comprises one or more of: read receipt from an intended recipient, detach receipt from an intended recipient, read receipt from an unintended recipient, and detach receipt from an unintended recipient, wherein an intended recipient is a recipient specified by the sender, and an unintended recipient is a user who receives the e-mail message that has been forwarded by the recipient specified by the sender.

5. The method according to claim 1, further comprising the steps of:

comparing the respective initial values of the e-mail message status parameters stored in the first set of details with the respective delivery values of the e-mail message status parameters stored in the second set of details from said recording of the e-mail data log file for the e-mail message;

comparing the respective initial values of the file attachment status parameters stored in the first set of details from said writing with the respective delivery values of the file attachment status parameters store in the second set of details from said recording of the e-mail data log file for the file attachment, wherein the file attachment status parameters in the first set of details are respectively corresponding to the file attachment status parameters in the second set of details;

discovering that all initial values of the e-mail message status parameters in the first set of details are respectively identical to a respectively corresponding delivery value of the e-mail message status parameters in the second set of details and that all initial values of the file attachment status parameters in the first set of details are respectively identical to a respectively corresponding delivery value of the file attachment status parameters in the second set of details; and determining, responsive to said discovering, that said sender does not need an error notification from the sender e-mail client machine since both said e-mail message and the file attachment are successfully delivered to the recipient.

6. A computer program product comprising:

a non-transitory computer readable storage medium having a computer readable program code embodied therein, said computer readable program code containing instructions that perform tracking a file attachment sent in an e-mail message, said tracking comprising the steps of:

attaching the file attachment to the e-mail message created by a sender using an e-mail application running on a sender e-mail client machine, wherein the e-mail application enables the sender to interact with the sender e-mail client machine such that the sender configures said tracking;

determining that the sender requires a return receipt for the file attachment from a recipient of the e-mail message, wherein the recipient is specified by a responding recipient list provided by the sender, wherein the responding recipient list is at least one e-mail address selected from a group consisting of a To group recipients of the e-mail message, a Cc group recipients of the e-mail message, a Bcc group recipients of the e-mail message, an individual recipient of the e-mail message, and combinations thereof, and wherein the return receipt comprises respective delivery values of file attachment status parameters and respective delivery values of e-mail message status parameters;

selecting values for one or more return receipt properties for the file attachment attached to said e-mail message pursuant to a respective input from the sender via the e-mail application for each return receipt property of the one or more return receipt properties such that the sender configures a manner in which said tracking is performed, wherein said one or more return receipt properties are selected from a group consisting of a logfile location property, a logfile collection property, a return receipt delivery option property, and a return receipt client option property;

sending said e-mail message having the file attachment attached thereto to a recipient e-mail client machine corresponding to the recipient specified for said e-mail message, wherein the e-mail message requires, from the recipient e-mail client machine corresponding to the recipient specified in the responding recipient list, the return receipt comprising the respective delivery values of the file attachment status parameters and the respective delivery values of the e-mail message status parameters generated by the recipient e-mail client machine;

writing, to an e-mail data log file in a logfile directory indicated by a value of the logfile location property of said one or more return receipt properties on said sender e-mail client machine, a first set of details comprising respective initial values of the file attachment status parameters and respective initial values of the e-mail message status parameters at a time of said sending; and recording a second set of details to said e-mail data log file, the second set of details comprising respective delivery values of the file attachment status parameters and respective delivery values of the e-mail message status parameters such that said second set of details describes whether or not said e-mail message and the file attachment have been successfully delivered to the recipient specified in the responding recipient list, responsive to receiving the return receipt from the recipient e-mail client machine corresponding to the recipient, wherein the return receipt comprises the respective delivery values for the file attachment status parameters and the respective delivery values of the e-mail message status parameters at a time when the e-mail message had been delivered to the recipient e-mail client machine subsequent to said sending, wherein the file attachment status parameters are selected from a group comprising a file name, a file type, a file creation date, a file size, a file access permission, and combinations thereof, and wherein the e-mail message status parameters are selected from a group comprising the sender, the recipient, a subject, a time message sent, and a date message sent, and wherein the e-mail data log file further comprises the logfile directory and a name of the e-mail data log file.

7. The computer program product according to claim 6, said tracking further comprising the steps of:

determining that either a delivery failure or a delivery discrepancy had occurred for the file attachment attached to said e-mail message sent to the recipient by as a result of:

comparing the respective initial values of the e-mail message status parameters stored in the first set of details from said writing with the respective delivery values of the e-mail message status parameters stored as the second set of details from said recording of the e-mail data log file for the file attachment, wherein the e-mail message status parameters in the first set of details are respectively corresponding to the e-mail message status parameters in the second set of details;

comparing the respective initial values of the file attachment status parameters stored in the first set of details from said writing with the respective delivery values of the file attachment status parameters stored in the second set of details from said recording of the e-mail data log file for the file attachment, wherein the file attachment status parameters in the first set of details are respectively corresponding to the file attachment status parameters in the second set of details;

discovering that at least one initial value of the e-mail message status parameters in the first set of details is different from a corresponding delivery value of the e-mail message status parameters in the second set of details or that at least one initial value of the file attachment status parameters in the first set of details is different from a corresponding delivery value of the file attachment status parameters in the second set of details; and sending an error notification to said sender, the error notification indicates that either the delivery failure or the delivery discrepancy had occurred for the file attachment attached to said e-mail message sent to the recipient, wherein the error notification is sent via another e-mail, such that the sender determines whether or not to resend the e-mail message and the file attachment to the recipient based on the error notification.

8. The computer program product according to claim 7, wherein a first value of the logfile location property is selected from a first group consisting of a predefined default location and a new location specified by the sender;

a second value of the logfile collection property is selected from a second group consisting of a separate collection and an aggregate collection, the separate collection value representing that a respective return receipt for each file attachment in the e-mail message is created as a respective file attachment log file, and the aggregate collection value representing that a return receipt for all file attachments in the e-mail message is created as the e-mail data log file;

a third value of the return receipt delivery option property is selected from a third group consisting of in-email and log-file, the in-mail value representing that the sender receives a return receipt arrival notification mail from the e-mail application in the sender e-mail client machine when the return receipt arrives from the recipient, and the log-file value represents that the return receipt is written directly to the e-mail data log file for processing; and a fourth value of the return receipt client option property is selected from a fourth group consisting of a delete and a receive, the delete value represents that the sender deletes the return receipt if the e-mail data log file is missing, and the receive value represents that the sender receives the return receipt even if the e-mail data log file is missing.

9. The computer program product according to claim 7, wherein said one or more return receipt properties for said one or more file attachments further comprises one or more of: read receipt from an intended recipient, detach receipt from an intended recipient, read receipt from an unintended recipient, and detach receipt from an unintended recipient, wherein an intended recipient is a recipient specified by the sender, and an unintended recipient is a user who receives the e-mail message that has been forwarded by the recipient specified by the sender.

10. The computer program product according to claim 6, said tracking further comprising the steps of:

comparing the respective initial values of the e-mail message status parameters stored in the first set of details with the respective delivery values of the e-mail message status parameters stored in the second set of details from said recording of the e-mail data log file for the e-mail message;

comparing the respective initial values of the file attachment status parameters stored in the first set of details from said writing with the respective delivery values of the file attachment status parameters store in the second set of details from said recording of the e-mail data log file for the file attachment, wherein the file attachment status parameters in the first set of details are respectively corresponding to the file attachment status parameters in the second set of details;

discovering that all initial values of the e-mail message status parameters in the first set of details are respectively identical to a respectively corresponding delivery value of the e-mail message status parameters in the second set of details and that all initial values of the file attachment status parameters in the first set of details are respectively identical to a respectively corresponding delivery value of the file attachment status parameters in the second set of details; and determining, responsive to said discovering, that said sender does not need an error notification from the sender e-mail client machine since both said e-mail message and the file attachment are successfully delivered to the recipient.

11. A process for supporting computer infrastructure, said process comprising providing at least one support service for at least one of creating, integrating, hosting, maintaining, and deploying computer-readable code in a computing system, wherein the code in combination with the computing system is capable of performing a method for tracking a file attachment sent in an e-mail message, said tracking comprising:

attaching the file attachment to the e-mail message created by a sender using an e-mail application running on a sender e-mail client machine, wherein the e-mail application enables the sender to interact with the sender e-mail client machine such that the sender configures said tracking;

determining that the sender requires a return receipt for the file attachment from a recipient of the e-mail message, wherein the recipient is specified by a responding recipient list provided by the sender, wherein the responding recipient list is at least one e-mail address selected from a group consisting of a To group recipients of the e-mail message, a Cc group recipients of the e-mail message, a Bcc group recipients of the e-mail message, an individual recipient of the e-mail message, and combinations thereof, and wherein the return receipt comprises respective delivery values of file attachment status parameters and respective delivery values of e-mail message status parameters;

selecting values for one or more return receipt properties for the file attachment attached to said e-mail message pursuant to a respective input from the sender via the e-mail application for each return receipt property of the one or more return receipt properties such that the sender configures a manner in which said tracking is performed, wherein said one or more return receipt properties are selected from a group consisting of a logfile location property, a logfile collection property, a return receipt delivery option property, and a return receipt client option property;

sending said e-mail message having the file attachment attached thereto to a recipient e-mail client machine corresponding to the recipient specified for said e-mail message, wherein the e-mail message requires, from the recipient e-mail client machine corresponding to the recipient specified in the responding recipient list, the return receipt comprising the respective delivery values of the file attachment status parameters and the respective delivery values of the e-mail message status parameters generated by the recipient e-mail client machine;

writing, to an e-mail data log file in a logfile directory indicated by a value of the logfile location property of said one or more return receipt properties on said sender e-mail client machine, a first set of details comprising respective initial values of the file attachment status parameters and respective initial values of the e-mail message status parameters at a time of said sending; and recording a second set of details to said e-mail data log file, the second set of details comprising respective delivery values of the file attachment status parameters and respective delivery values of the e-mail message status parameters such that said second set of details describes whether or not said e-mail message and the file attachment have been successfully delivered to the recipient specified in the responding recipient list, responsive to receiving the return receipt from the recipient e-mail client machine corresponding to the recipient, wherein the return receipt comprises the respective delivery values for the file attachment status parameters and the respective delivery values of the e-mail message status parameters at a time when the e-mail message had been delivered to the recipient e-mail client machine subsequent to said sending, wherein the file attachment status parameters are selected from a group comprising a file name, a file type, a file creation date, a file size, a file access permission, and combinations thereof, and wherein the e-mail message status parameters are selected from a group comprising the sender, the recipient, a subject, a time message sent, and a date message sent, and wherein the e-mail data log file further comprises the logfile directory and a name of the e-mail data log file.

12. The process according to claim 11, said tracking further comprising the steps of:

determining that either a delivery failure or a delivery discrepancy had occurred for the file attachment attached to said e-mail message sent to the recipient as a result of:

comparing the respective initial values of the e-mail message status parameters stored in the first set of details from said writing with the respective delivery values of the e-mail message status parameters stored as the second set of details from said recording of the e-mail data log file for the file attachment, wherein the e-mail message status parameters in the first set of details are respectively corresponding to the e-mail message status parameters in the second set of details;

comparing the respective initial values of the file attachment status parameters stored in the first set of details from said writing with the respective delivery values of the file attachment status parameters stored in the second set of details from said recording of the e-mail data log file for the file attachment, wherein the file attachment status parameters in the first set of details are respectively corresponding to the file attachment status parameters in the second set of details;

discovering that at least one initial value of the e-mail message status parameters in the first set of details is different from a corresponding delivery value of the e-mail message status parameters in the second set of details or that at least one initial value of the file attachment status parameters in the first set of details is different from a corresponding delivery value of the file attachment status parameters in the second set of details; and sending an error notification to said sender, the error notification indicates that either the delivery failure or the delivery discrepancy had occurred for the file attachment attached to said e-mail message sent to the recipient, wherein the error notification is sent via another e-mail, such that the sender determines whether or not to resend the e-mail message and the file attachment to the recipient based on the error notification.

13. The process according to claim 12, wherein a first value of the logfile location property is selected from a first group consisting of a predefined default location and a new location specified by the sender;

a second value of the logfile collection property is selected from a second group consisting of a separate collection and an aggregate collection, the separate collection value representing that a respective return receipt for each file attachment in the e-mail message is created as a respective file attachment log file, and the aggregate collection value representing that a return receipt for all file attachments in the e-mail message is created as the e-mail data log file;

a third value of the return receipt delivery option property is selected from a third group consisting of in-email and log-file, the in-mail value representing that the sender receives a return receipt arrival notification mail from the e-mail application in the sender e-mail client machine when the return receipt arrives from the recipient, and the log-file value represents that the return receipt is written directly to the e-mail data log file for processing; and a fourth value of the return receipt client option property is selected from a fourth group consisting of a delete and a receive, the delete value represents that the sender deletes the return receipt if the e-mail data log file is missing, and the receive value represents that the sender receives the return receipt even if the e-mail data log file is missing.

14. The process according to claim 12, wherein said one or more return receipt properties for said one or more file attachments further comprises one or more of: read receipt from an intended recipient, detach receipt from an intended recipient, read receipt from an unintended recipient, and detach receipt from an unintended recipient, wherein an intended recipient is a recipient specified by the sender, and an unintended recipient is a user who receives the e-mail message that has been forwarded by the recipient specified by the sender.

15. The process according to claim 11, said tracking further comprising the steps of:

comparing the respective initial values of the e-mail message status parameters stored in the first set of details with the respective delivery values of the e-mail message status parameters stored in the second set of details from said recording of the e-mail data log file for the e-mail message;

comparing the respective initial values of the file attachment status parameters stored in the first set of details from said writing with the respective delivery values of the file attachment status parameters store in the second set of details from said recording of the e-mail data log file for the file attachment, wherein the file attachment status parameters in the first set of details are respectively corresponding to the file attachment status parameters in the second set of details;

discovering that all initial values of the e-mail message status parameters in the first set of details are respectively identical to a respectively corresponding delivery value of the e-mail message status parameters in the second set of details and that all initial values of the file attachment status parameters in the first set of details are respectively identical to a respectively corresponding delivery value of the file attachment status parameters in the second set of details; and determining, responsive to said discovering, that said sender does not need an error notification from the sender e-mail client machine since both said e-mail message and the file attachment are successfully delivered to the recipient.

* * * * *